(12) United States Patent
Hironaka et al.

(10) Patent No.: US 7,694,077 B2
(45) Date of Patent: Apr. 6, 2010

(54) MULTI-PORT INTEGRATED CACHE

(75) Inventors: Tetsuo Hironaka, Hiroshima (JP); Hans Jürgen Mattausch, Higashihiroshima (JP); Tetsushi Koide, Higashihiroshima (JP); Tai Hirakawa, Hiroshima (JP); Koh Johguchi, Hiroshima (JP)

(73) Assignee: Semiconductor Technology Academic Research Center, Yokohama-shi (JP)

( * ) Notice: Subject to any disclaimer, the term of this patent is extended or adjusted under 35 U.S.C. 154(b) by 71 days.

(21) Appl. No.: 12/034,454

(22) Filed: Feb. 20, 2008

(65) Prior Publication Data
US 2008/0222360 A1 Sep. 11, 2008

Related U.S. Application Data

(62) Division of application No. 10/687,460, filed on Oct. 15, 2003, now Pat. No. 7,360,024.

(30) Foreign Application Priority Data
Nov. 1, 2002 (JP) ............... 2002-320037

(51) Int. Cl.
G06F 12/00 (2006.01)

(52) U.S. Cl. ............... 711/131; 711/123; 711/149; 365/230.05

(58) Field of Classification Search ............ 711/3, 711/5, 123, 131, 149, 170; 365/230.05
See application file for complete search history.

(56) References Cited

U.S. PATENT DOCUMENTS 5,784,630 A  7/1998  Saito 6,029,242 A *  2/2000  Sidman ............... 712/42
6,378,050 B1  4/2002  Tsuruta
6,647,465 B2  11/2003  Kametani (Continued)

FOREIGN PATENT DOCUMENTS

JP  4-257949 A  9/1992
JP  2002-55879 A  2/2002

OTHER PUBLICATIONS

Mattausch, H.J., "Hierarchical Architecture for Area-Efficient Integrated N-Port Memories With Latency-Free Multi-Gigabit Per Second Access Bandwidth," Electronics Letters 35(17):1441-1443, 1999.

(Continued)

Primary Examiner—Jasmine Song
(74) Attorney, Agent, or Firm—Christensen O'Connor Johnson Kindness PLLC

(57) ABSTRACT

A multi-port instruction/data integrated cache which is provided between a parallel processor and a main memory and stores therein a part of instructions and data stored in the main memory has a plurality of banks, and a plurality of ports including an instruction port unit consisting of at least one instruction port used to access an instruction from the parallel processor and a data port unit consisting of at least one data port used to access data from the parallel processor. Further, a data width which can be specified to the bank from the instruction port is set larger than a data width which can be specified to the bank from the data port.

11 Claims, 25 Drawing Sheets

U.S. PATENT DOCUMENTS

| | | |
|---|---|---|
| 6,678,789 B2 | 1/2004 | Shibayama |
| 6,754,777 B1 | 6/2004 | Au |
| 6,845,429 B2 | 1/2005 | Mattausch |

OTHER PUBLICATIONS

Mattausch, H.J., "Hierarchical N-Port Memory Architecture Based on 1-Port Memory Cells," Proceedings of the 23rd European Solid-State Circuits Conference (ESSCIRC197), Southampton, UK, Sep. 16-18, 1997, pp. 348-351.

Mattausch, H.J., and K. Yamada, "Application of Port-Access-Rejection Probability Theory for Integrated N-Port Memory Architecture Optimisation," Electronics Letters 34(9):861-862, 1998.

Mattausch, H.J., et al., "Area-Efficient Multi-Port SRAMs for On-Chip Data-Storage With High Random-Access Bandwidth," IEICE Transactions on Electronics E84-C(3):410-417, 2001.

Tatsumi, Y., and H.J. Mattausch, "Fast Quadratic Increase of Multiport-Storage-Cell Area With Port Number," Electronics Letters 35(25):2185-2187, 1999.

* cited by examiner

MULTI-PORT INTEGRATED CACHE

CROSS-REFERENCE TO RELATED APPLICATIONS

This application is a divisional of prior application Ser. No. 10/687,460, filed Oct. 15, 2003, priority from the filing date of which is hereby claimed under 35 U.S.C. § 120. This application is based upon and claims the benefit of priority from prior Japanese Patent Application No. 2002-320037, filed Nov. 1, 2002, the entire contents of which are incorporated herein by reference.

BACKGROUND

1. Field of the Invention

The present invention relates to a cache provided between a processor and a main memory which stores therein programs or various kinds of data or information, and more particularly to a multi-port integrated cache in which a plurality of types of caches including an instruction cache are integrated.

2. Description of the Related Art

Generally, as shown in FIG. 1A, in order to improve a processing speed of a processor 1, a cache 2 is interposed between the processor 1 and a main memory 3. From various kinds of information (data) stored in the main memory 3, information to which the processor 1 frequently has access is copied to cache 2. Further, when the processor 1 accesses cache 2 instead of the main memory 3, high-speed processing by the processor is enabled.

Therefore, when the processor 1 accesses the cache 2 but target information (data) is not stored in the cache 2, a cache miss is generated. When the cache miss occurs, the processor 1 reads the target information (data) from the main memory 3 and writes it in the cache 2. A minimum unit of information (data) transmitted/received between this main memory 3 and the cache 2 is referred to as a unit block.

In recent years, in order to improve a processing speed of the processor 1, a parallel processor which executes a plurality of types of processing in one clock cycle as typified by a super scalar processor has come into practical use. In the processor 1 performing this parallel processing, it is required to simultaneously access an instruction (machine instruction) and data (arithmetic operation data) from the cache 2, for example. In order to simultaneously have access to a plurality of sets of information (data) from one memory, one memory must have a plurality of ports (write/read terminals).

However, since there is no technique to create a multi-port memory with a large capacity which can be used for the cache, independent one-port caches are provided by utilizing a fact that access patterns relative to the machine instruction and the arithmetic operation data are different from each other. For example, FIG. 1B shows an example that the cache 2 depicted in FIG. 1A is divided into an instruction cache 4 which stores therein only instructions (machine instructions) and a data cache 5 which stores therein only data (arithmetic operation data).

It is to be noted that a difference between an access pattern of the instructions and an access pattern of the data is as follows. One instruction includes a plurality of steps which cannot be divided, and contiguous addresses are accessed. Therefore, in the access pattern of instructions, a required data width (number of bits of data read at a time) is large. On the contrary, it is often the case that the data is relatively randomly accessed, and hence a required data width (bit number of data read at a time) is small in the access pattern of the data.

However, optimal storage capacities for the respective caches 4 and 5 are different in accordance with each program stored in the main memory 3. Therefore, comparing with one cache 2 in which the capacities of the respective caches 4 and 5 are added, a fragmentation is generated and a utilization efficiency of the storage capacity is reduced. Furthermore, a cache miss ratio is increased when a program with a large working set is executed.

Moreover, generally, when the number of accessible ports is increased in the memory, an increase in a necessary area of the memory in proportion to a square of the number of ports is described in the following cited reference: H. J. Mattausch, K. Kishi and T. Gyohten, "Area efficient multi-port SRAMs for on-chip storage high random-access bandwidth "IEICE Trans on Electronics vol. E84-C, No. 3, 2001, p410-417

Therefore, as an area cost and a wiring delay are increased, it is hard to configure a large-capacity cache.

Additionally, as shown in FIG. 1C, a speed of the processor 1 can be increased by providing a trace cache 6 besides the instruction cache 4. A string of instructions which have been once executed by the processor 1 is stored in the trace cache 6. Further, when the processor 1 newly executes an instruction, it retrieves data in the instruction cache 4 and the trace cache 6 at the same time by using an address (fetch address). The processor 1 adopts data of an instruction string of the trace cache 6 when there are hits in the both caches, and adopts data of the command in the instruction cache 4 when there is no hit in the trace cache 6.

The detailed operations of the instruction cache 4 and the trace cache 6 will now be described with reference to FIG. 2.

Basic blocks A to E corresponding to respective instructions are stored in a program 7 saved in the main memory 3. Incidentally, as to the execution order, the basic block A is determined as a top, B is skipped, and the processing diverges to the basic blocks C and D.

In such a state, the basic blocks A to E in the program 7 are sequentially stored every one line from the top in the instruction cache 4. On the other hand, the basic blocks A, C and D which have been actually executed are sequentially stored in the trace cache 6.

Next, there is considered a case that execution is again performed from the basic block A like a previous execution history of A, C and D. In this case, the respective basic blocks of the instructions are stored in the instruction cache 4 in the order like the storage order in the memory. Therefore, the processor 1 first fetches one line including the basic blocks A, B and C, then deletes B, and fetches one line including the basic blocks C, D and E. Therefore, the processor 1 requires two cycles in order to fetch the target basic blocks A, C and D.

On the other hand, since an instruction string (basic blocks A, C and D) which has been once executed is stored in the trace cache 6, it is possible to cope with the segmentation of the command string (basic block string), and a fetch efficiency of the processor 1 can be improved.

As described above, when only the instruction cache 4 is used, the fetch efficiency is lowered due to the segmentation of the instruction string owing to a branch instruction, three or four of which branch instructions are assumed to exist in 16 instructions. Therefore, the trace cache 6 is provided. Furthermore, as described above, the processor 1 confirms hit statuses of the two caches 4 and 6, fetches a target instruction string (basic block string) from the trace cache 6 when there is a hit in the trace cache 6, and fetches the target instruction string (basic block string) from the instruction cache 4 when there is a cache miss in the trace cache 6.

However, the following problems still occur even if the trace cache 6 is provided besides the instruction cache 4 as mentioned above.

Although cache capacities required in a time series vary in the trace cache 6 and the instruction cache 4, the respective capacities of the trace cache 6 and the instruction cache 4 are fixed, and hence a capacity ratio cannot be dynamically changed. Therefore, a utilization efficiency of the entire caches is lowered.

Since duplicative instructions (basic blocks) exist in the instruction cache 4 and the trace cache 6, the utilization efficiency of the entire caches is reduced.

When it is predicted that the basic block A branches to the basic block B by a branch prediction, the instruction of only the basic block A is issued (fetched) from the trace cache 6.

Since the basic blocks are stored in the trace cache 6 with one basic block determined as a top, data strings with C and D being determined as tops may be additionally possibly stored in the trace cache 6 when the executed instruction strings A, C and D exist as shown in FIG. 2. Therefore, an overlap of data (basic blocks) occurs in the trace cache 6, and an effective utilization ratio of the caches is lowered.

In a cache system in which the instruction cache 4 and the data cache 5 shown in FIG. 1B are individually provided or in a cache system in which the trace cache 6 is provided besides the instruction cache 4 shown in FIG. 1C as described above, each cache has a small capacity, mutual transfer of excessive capacities is impossible between the respective caches, and a cache miss generation ratio is increased as a whole. Moreover, overlapping storage of data (basic blocks) occurs between the instruction cache and the trace cache, thereby reducing the effective utilization ratio of the caches.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

It is an object of the present invention to provide a multi-port integrated cache which uses a bank structure, can arbitrarily set a data width and a capacity with respect to each port, consequently integrate instructions or information of data having different access patterns in one cache, prevent occurrence of a fragmentation and increase an effective capacity of the cache.

Additionally, to achieve this aim, according to a first aspect of the present invention, there is provided a multi-port instruction/data integrated cache which is provided between a parallel processor to execute a plurality of types of processing in one clock cycle and a main memory and which stores a part of instructions and data saved in the main memory, comprising: a plurality of banks and a plurality of ports including; an instruction port unit consisting of at least one port used to have access to an instruction from the parallel processor, and a data port unit consisting of at least one data port used to have access to data from the parallel processor.

Further, a data width which can be specified from the instruction port to the bank is set larger than a data width which can be specified from the data port to the bank.

In the multi-port instruction/data integrated cache having the above-described structure, by adopting a bank structure memory, an accessible data width can be basically changed by varying the number of banks to be simultaneously accessed from the respective ports.

Furthermore, a data width which can be specified from the instruction port to the bank (bit number of data which can be specified at a time) is set larger than a data width which can be specified from the data port to the bank. In each port, even if a data width indicative of the bit number (size of a basic block) of an instruction string which can be fetched at a time is set large, occurrence of an access contention can be suppressed. On the contrary, in the data port, the bit number of data which can be fetched at a time is small and is relatively randomly accessed, thereby enabling access to all the banks.

According to a second aspect of the present invention, there is provided a multi-port instruction/trace integrated cache, comprising: a multi-port bank memory having a plurality of banks which store a part of instruction data saved in a main memory and a plurality of ports; instruction data reading means for reading specified instruction data from the multi-port bank memory as instruction data of an instruction cache when a parallel processor has access to the multi-port bank memory as the instruction cache; and trace data reading means for reading specified instruction data from the multi-port bank memory as trace data of a trace cache when the parallel processor has access to the multi-port bank memory as the trace cache.

In the multi-port instruction/trace integrated cache having the above-described structure, the multi-port bank memory stores therein a part of instruction data saved in the main memory. Therefore, as to respective sets of instruction data stored in the multi-port bank memory, there is no discrimination between the instruction data of the instruction cache and the instruction data constituting the trace data of the trace cache.

Moreover, when the parallel processor specifies the instruction data in the multi-port bank memory by using a fetch address, a judgment is made based on whether it has access as the instruction cache or it has access as the trace cache by using, e.g., a cache hit circuit or the like. Based on a result of that judgment, the instruction data is read as the instruction data of the instruction cache, or it is read as the trace data of the trace cache.

Therefore, both data of the trace cache and data of the instruction cache can exist in the same cache, thereby realizing the effective utilization of the cache capacity. Additionally, duplicative storage of the same instruction data can be reduced.

According to a third aspect of the present invention, there is provided a multi-port instruction/trace integrated cache, comprising: a multi-port bank memory having a plurality of banks which store a part of instruction data saved in a main memory and a plurality of ports, and a tag directory having a plurality of areas corresponding to each index set to a middle-order digit in a fetch address outputted from a parallel processor. It is to be noted that in each area are stored an identification bit indicating whether instruction data to be accessed is data of a trace cache, a tag 1 set to a high-order digit in the fetch address, a tag 2 set to a low-order digit in the fetch address, and a plurality of addresses specifying the instruction data stored in each bank of the multi-port bank memory.

Further, the multi-port instruction/trace integrated cache comprises: an instruction cache hit judgment circuit which judges that instruction data to be accessed is stored in the multi-port bank memory based on the tag 1 and the identification bit; a trace cache hit judgment circuit which judges that an instruction data string to be accessed is stored in the multi-port bank memory based on the tag 1, the tag 2 and the identification bit; and a fetch address selector which selects a predetermined number of addresses among a plurality of addresses stored in a corresponding area of the tag directory and supplies them to the multi-port bank memory in accordance with a hit judgment by the trace cache hit judgment circuit, and causes instruction data in each bank to be simultaneously read.

In the multi-port instruction/trace integrated cache in which the instruction cache and the trace cache are integrated, accessing methods in the instruction cache and the trace cache must be integrated, and it is required to identify which cache has data at the time of access. Since continuous instructions are stored in the instruction cache, it is possible to freely have access to data in a line. On the other hand, since instruction strings are aligned in the trace cache in the order of a dynamic instruction flow, and hence access is possible only from a top address.

In order to integrate the access methods, in the present invention, there are provided a bit used to identify whether data is data of the trace cache and two tags 1 and 2 for access. In access based on the instruction cache, only the tag 1 is required. On the other hand, in case of data from the trace cache, the tag 1 and the tag 2 are used to compare lower bits of the address, start positions of the trace data are compared, and access is effected.

By adopting such an access method, both data of the trace cache and data of the instruction cache can exist in the same cache, thereby realizing the effective utilization of the cache capacity.

Furthermore, in order to effectively utilize the integrated cache, fine lines are realized by using the bank structure in the cache. As a result, instruction strings can be read from a plurality of the banks when fetching instructions, and the instruction strings are fetched in accordance with a branch prediction.

According to a fourth aspect of the present invention, there is provided a multi-port instruction/trace integrated cache comprising: a multi-port bank memory having a plurality of banks which store a part of instruction data saved in a main memory and a plurality of ports; and a plurality of tag directories to which fetch addresses which are different from each other based on a fetch address of the parallel processor are respectively inputted from a fetched line address cache, and have a plurality of areas corresponding to each index set to a middle-order digit in each inputted fetch address. It is to be noted that in each area are stored an identification bit indicating whether instruction data to be accessed is data of a trace cache, a tag 1 set to a high-order digit in the fetch address, and a tag 2 set to a low order digit in the fetch address.

Moreover, the multi-port instruction/trace integrated cache comprises: a plurality of instruction cache hit judgment circuits which are provided in accordance with each tag directory and judge that instruction data to be accessed is stored in the multi port bank memory based on the tag 1 and the identification bit; a plurality of trace cache hit judgment circuits which are provided in accordance with each tag directory and judge that an instruction data string to be accessed is stored in the multi-port bank memory based on the tag 1, the tag 2 and the identification bit; and a bank access circuit which supplies each fetch address inputted to a corresponding tag directory to the multi-port bank memory in accordance with a hit judgment of each cache hit judgment circuit and reads the instruction data of each bank at the same time.

In the multi-port instruction/trace integrated cache having the above-described structure, a plurality of addresses to be accessed next are stored in a fetched line address cache (FLAC) outside the integrated cache in place of the tag directories. In order to cope with a plurality of fetch addresses outputted from the fetched line address cache (FLAC), a plurality of tag directories are formed in the integrated cache.

According to a fifth aspect of the present invention, there is provided a multi-port instruction/trace integrated cache, comprising: a multi-port bank memory having a plurality of banks which store a part of instruction data saved in a main memory and a plurality of ports; and an instruction tag directory which has a plurality of areas corresponding to each index set to a middle-order digit in a fetch address outputted from a parallel processor. It is to be noted that in each area is stored a tag 1 set to a high-order digit in the fetch address.

Additionally, there is provided a trace tag directory having a plurality of areas corresponding to each index set to a middle-order digit in a fetch address outputted from the parallel processor. It is to be noted that in each area are stored a tag 1 set to a high-order digit in the fetch address, a tag 2 set to a low-order digit in the fetch address, and a plurality of addresses which specify instruction data stored in each bank of the multi-port bank memory.

Further, the multi-port instruction/trace integrated cache comprises: an instruction cache hit judgment circuit which judges that instruction data to be accessed is stored in the multi-port bank memory based on the tag 1; a trace cache hit judgment circuit which judges that an instruction data string to be accessed is stored in the multi-port bank memory based on the tag 1 and the tag 2; and a fetch address selector which selects a predetermined number of addresses among a plurality of addresses stored in a corresponding area of the tag directory in accordance with a hit judgment by the trace cache hit judgment circuit and supplies them to the multi-port bank memory, and causes instruction data of each bank to be simultaneously read.

In the multi-port instruction/trace integrated cache having the above-described structure, the tag directory provided in the integrated cache is divided into an instruction tag directory and a trace tag directory. Therefore, trace identification bits do not have to be set in the instruction tag directory and the trace tag directory. Accordingly, judgment processing of each cache hit judgment circuit is simplified.

According to a sixth aspect of the present invention, there is provided a multi-port instruction/trace/data integrated cache which is provided between a parallel processor performing a plurality of types of processing in one clock cycle and a main memory, and has a plurality of banks which store a part of instructions, traces and data stored in the main memory and a plurality of ports.

Furthermore, this multi-port instruction/trace/data integrated cache includes: a plurality of banks; a data port unit including an instruction port unit consisting of at least one instruction port used to have access to an instruction from the parallel processor, a trace port unit consisting of at least one port used to have access to a trace from the parallel processor, and a data port unit consisting of at least one data port used to have access to data from the parallel processor.

Moreover, each data width which can be specified to the bank from the instruction port and the trace port is set larger than a data width which can be specified to the bank from the data port.

By setting each port in this manner, the instruction cache, the trace cache and the data cache can be incorporated in one cache, and a storage capacity required as the entire cache can be further reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Each embodiment according to the present invention will now be described hereinafter with reference to the accompanying drawings.

First Embodiment

Figure 1A:
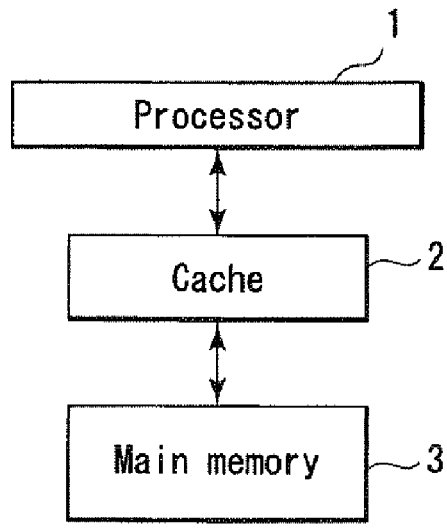
FIG. 1A is a view showing a relationship between a general cache and a processor.
Figure 1B:
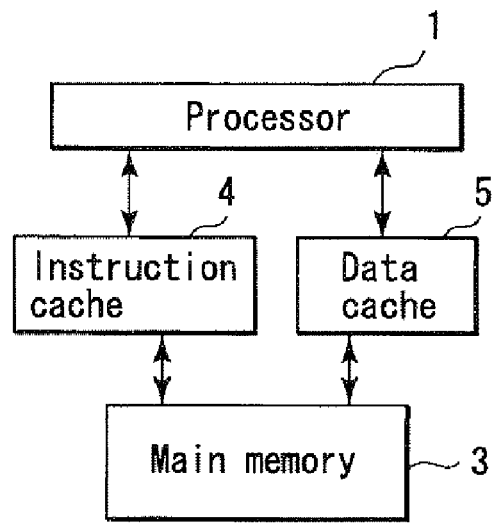
FIG. 1B is a view showing a relationship between another general cache and a processor.
Figure 1C:
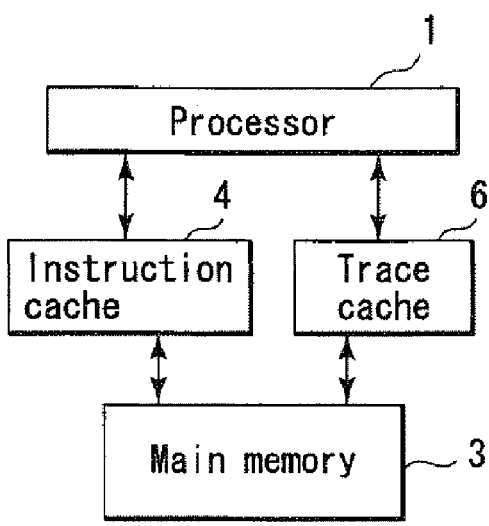
FIG. 1C is a view showing a relationship between still another general cache and a processor.
Figure 2:
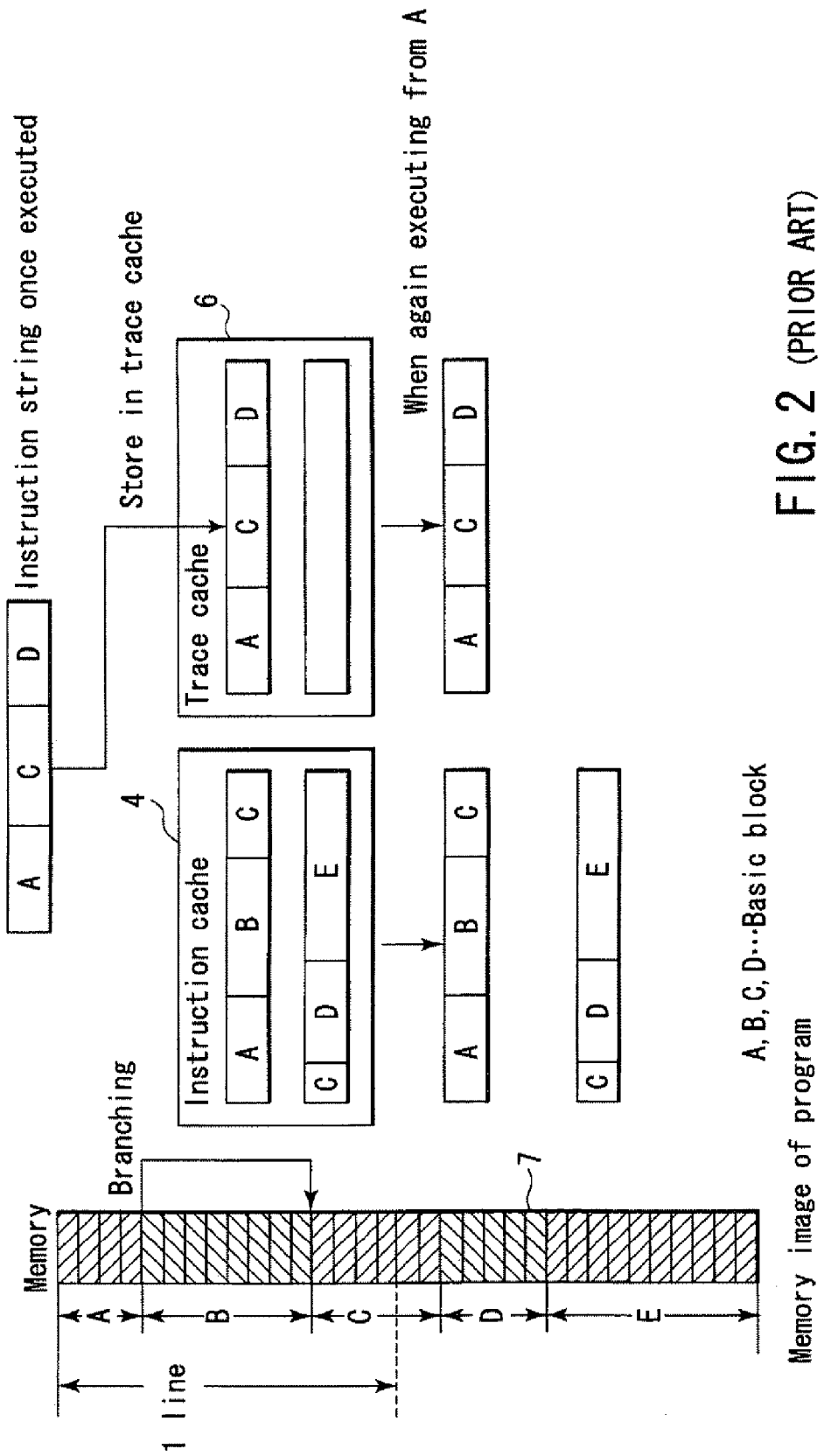
FIG. 2 is a view showing operations of a general trace cache and an instruction cache.
Figure 3:
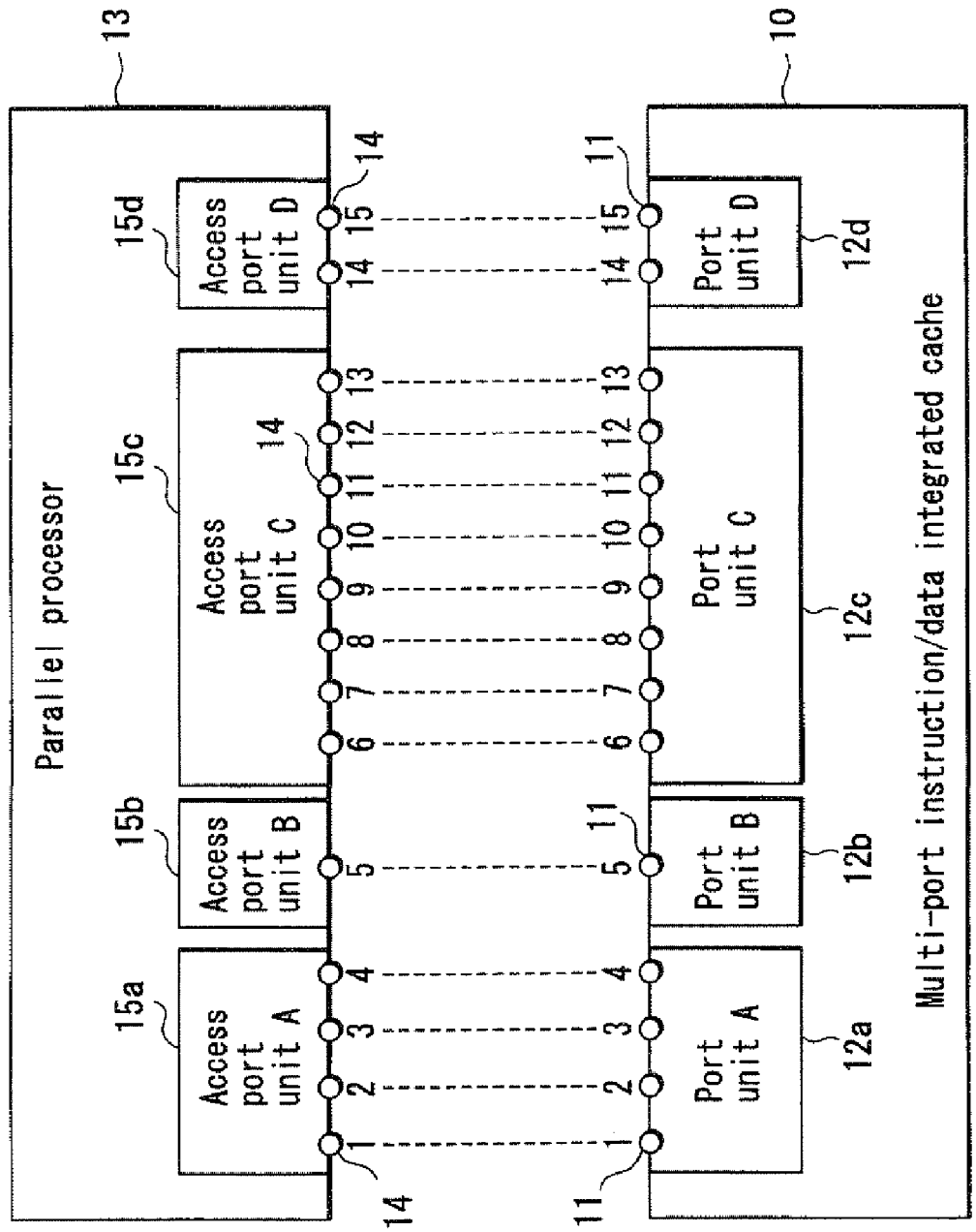
FIG. 3 is a type drawing showing a state that a multi-port instruction/data integrated cache according to a first embodiment of the present invention is connected to a parallel processor.

FIG. 3 is a type drawing showing a state that a multi-port instruction/data integrated cache according to the first embodiment of the present invention is connected to a parallel processor which executes a plurality of types of processing in one clock cycle.

To the multi-port instruction/data integrated cache 10 (which will be referred to as an integrated cache 10 hereinafter) are provided first to 15th ports 11. Each port 11 is constituted by an address terminal which specifies an address in the integrated cache 10, and a data terminal to/from which data accessed relative to a corresponding address in the integrated cache 10 is inputted/outputted.

The 15 ports 11 are divided into a plurality of port units 12a, 12b, 12c and 12d. Four ports, i.e., the first to fourth ports 11 belong to the port unit 12a, only the fifth port 11 belongs to the port unit 12b, eight ports, i.e., the sixth to 13th ports 11 belong to the port unit 12c, and two ports, i.e., the 14th and 15th ports 12 belong to the port unit 12d.

To the parallel processor 13 are provided 15 ports 14 corresponding to the respective first to 15th ports 11 of the integrated cache 10. The 15 ports 14 are divided into a plurality of access port units 15a, 15b, 15c and 15d like the integrated cache 10.

Figure 4:
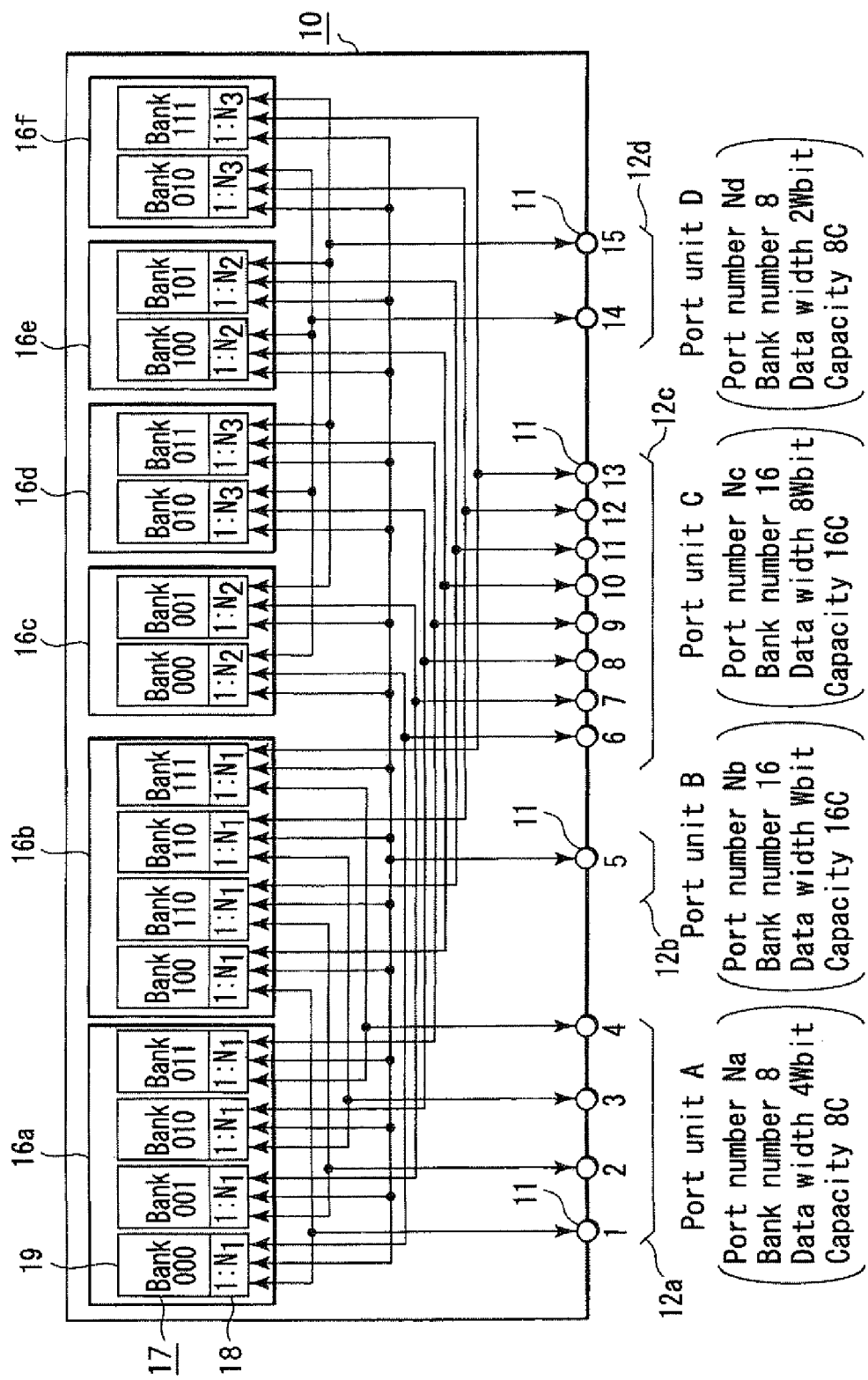
FIG. 4 is a schematic structural view showing the same integrated cache.

FIG. 4 is a type drawing showing a schematic structure of the integrated cache 10. 16 bank structures 17 are incorporated in the integrated cache 10. Each bank structure 17 is constituted by a port number conversion circuit 18 and a bank 19. The 16 bank structures 17 in which the banks 19 are incorporated are separated into six bank units 16a to 16f. The number of bank structures 17 are arbitrarily set.

The port number conversion circuits 18 in the respective bank structures 17 incorporated in the bank units 16a and 16b convert N1 ports on the ports 11 side into one port, and connect it to each bank 19. Therefore, the bank 19 constitutes a one-port memory having only one port.

The port number conversion circuits 18 in the respective bank structures 17 incorporated in the bank units 16c and 16e convert N2 ports on the ports 11 side into one port, and connect it to each bank 19. Likewise, the port number conversion circuits 18 in the respective bank structures 17 incorporated in the bank units 16d and 16f convert N3 ports on the ports 11 side into one port, and connect it to each bank 19.

The respective ports 11 in the port units 12a to 12d can access the banks 19 whose number is specified by the respective port units 12a to 12d or the banks 19 whose positions are specified by the same.

In this example, the port 11 in the port unit 12b can access all the banks 19. That is, the port 11 in the port unit 12b functions as a data port.

Access to the respective ports 11 in the other port units 12a, 12c and 12d is restricted by pre-decoding the banks 19, and each port 11 functions as a port 11 having a large data width. Further, the banks 19 which can be accessed from the respective port units 12a, 12c and 12d are also limited, and having access to the continuous banks 19 is inhibited. As a result, it is possible to deal with a difference in total capacity required by the respective port units 12a, 12c and 12d. That is, the respective ports 11 in the port units 12a, 12c and 12d function as instruction ports.

In the integrated cache 10 having such a structure, when the parallel processor 13 fetches an instruction stored in the integrated cache 10, the parallel processor 13 applies an address to the respective ports 11 of specified instruction ports (port units 12a, 12c and 12d). Furthermore, when the parallel processor 13 fetches data stored in the integrated cache 10, the parallel processor 13 applies an address to the port 11 of a specified data port (port unit 12b).

Figure 5:
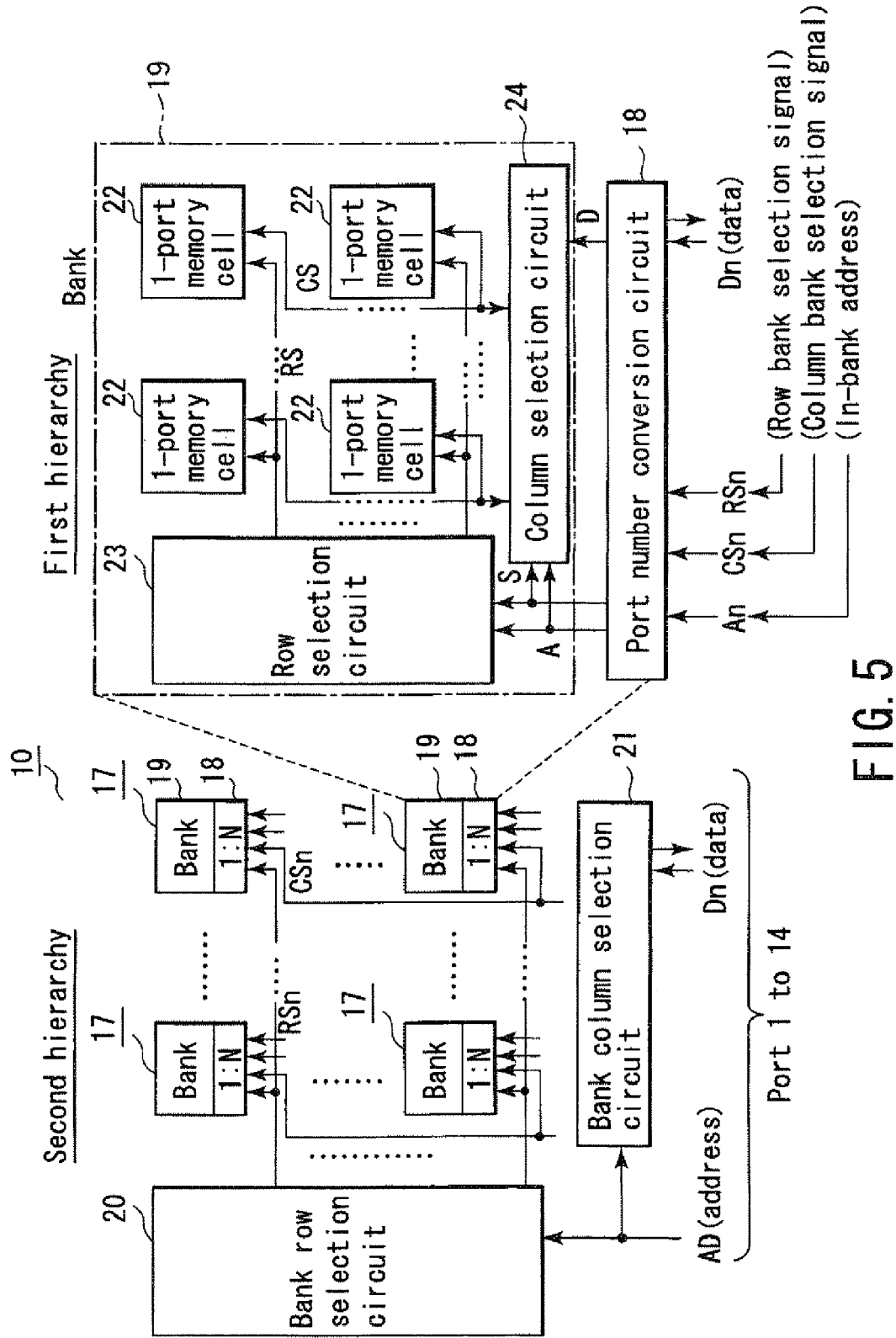
FIG. 5 is a detailed structural view when the same integrated cache is constituted by using an HMA structure.

FIG. 5 is a block structural view when the multi-port instruction/data integrated cache 10 illustrated in FIG. 4 is constituted by using a hierarchical multi port memory architecture (which will be referred to as HMA hereinafter) structure which is processed in the cited reference by H. J. Mattausch and others.

The integrated cache 10 constituted by using this HMA structure is roughly configured by a first hierarchy and a second hierarchy.

The second hierarchy is roughly constituted by a plurality of bank structures 17 which are arranged in a matrix form and each of which consists of a bank 19 and a port number conversion circuit 18, a bank row selection circuit 20, and a bank column selection circuit 21.

The bank row selection circuit 20 and the bank column selection circuit 21 convert n=15 addresses AD inputted from the respective first to 15th ports 11 into n row bank selection signals RSn, n column bank selection signals CSn, and n in-bank addresses An. The bank structure 17, from which n sets of data Dn are accessed, is determined by the n row bank selection signal RSn and the n column bank selection signals CSn.

In this case, since a bank contention occurs when the respective ports 11 simultaneously output the same address, a description will be given on the assumption that each bank structure 17 is not specified by a plurality of the ports 11 at the same time.

The bank 19 in the first hierarchy constituted by the bank structure 17 consisting of the bank 19 and the port number conversion circuit 18 is roughly configured by a plurality of one-port memory cells 22 arranged in a matrix form, a row selection circuit 23 and a column selection circuit 24.

The port number conversion circuit 18 supplies to the bank 19 a bank selection signal S indicating that this bank is specified by the n row bank selection signals RSn and the n column bank selection signals CSn, its own in-bank address A selected from the n in bank addresses An, and its own data D selected from the n sets of data Dn.

Upon receiving the bank selection signal S indicating that this bank is specified, the row selection circuit 23 and the row selection circuit 24 of the bank 19 use the in-bank address A to cause a row cell selection signal RS and a column cell selection signal CS which specify a one-port memory cell 22 which should be finally accessed to enter an operating state. Therefore, one register 22 which should be finally accessed enters an operating state. It is to be noted that the data D is incorporated in the column cell selection signal CS and applied to each one-port memory cell 22, but one one-port memory cell 22 which is in the operating state fetches the data D.

By constituting the integrated cache 10 by using the HMA structure in this manner, the number of ports incorporated in this integrated cache 10 can be greatly reduced, and the integrated cache 10 can be configured to have a high area efficiency and a small size.

Second Embodiment

Figure 6:
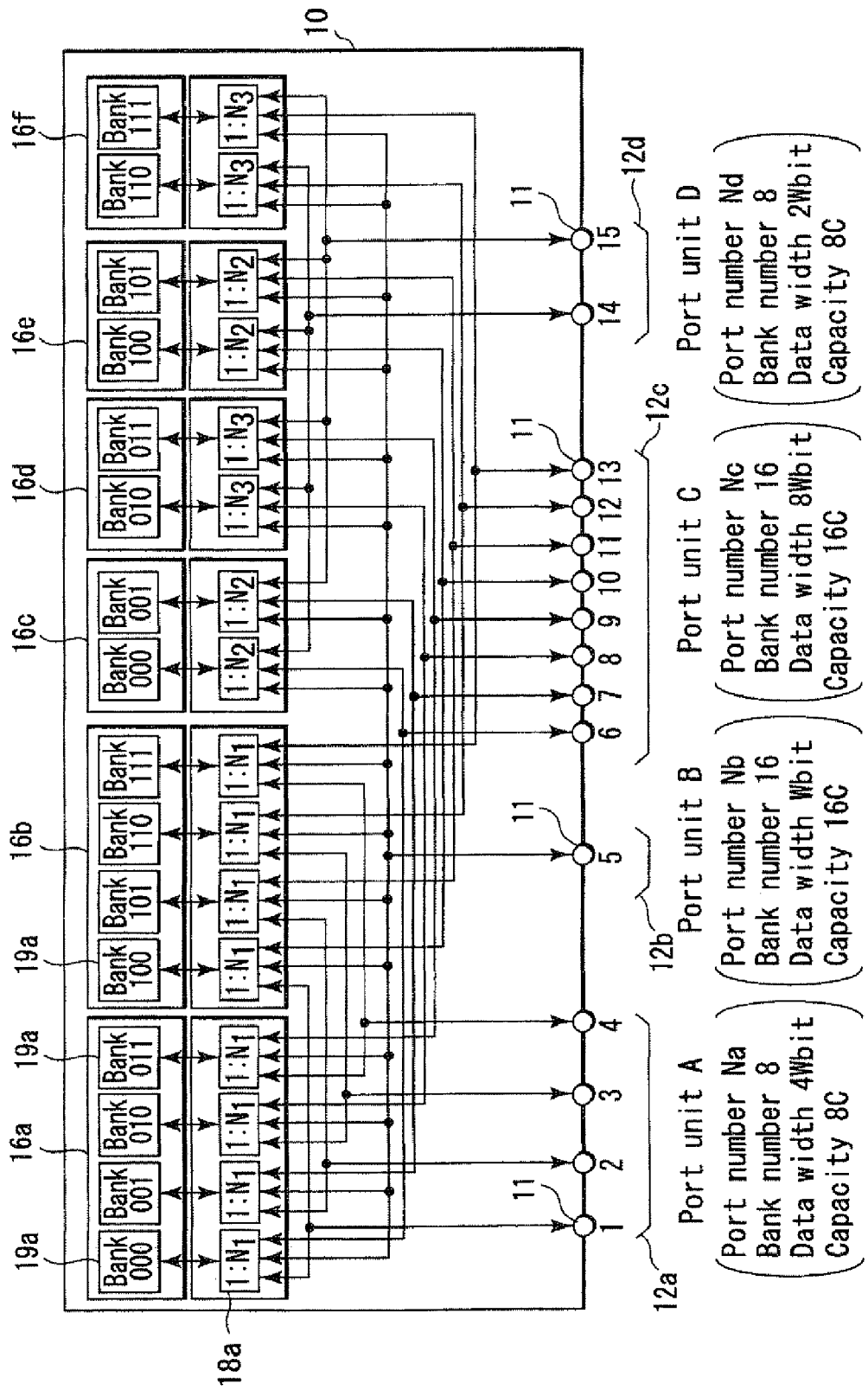
FIG. 6 is a schematic structural view showing a multi-port instruction/data integrated cache according to a second embodiment of the present invention.

FIG. 6 is a schematic structural view showing a multi-port instruction/data integrated cache according to the second embodiment of the present invention. Like reference numerals denote parts equal to those in the integrated cache 10 according to the first embodiment depicted in FIG. 4. Moreover, the detailed description on the same parts is eliminated.

Figure 7:
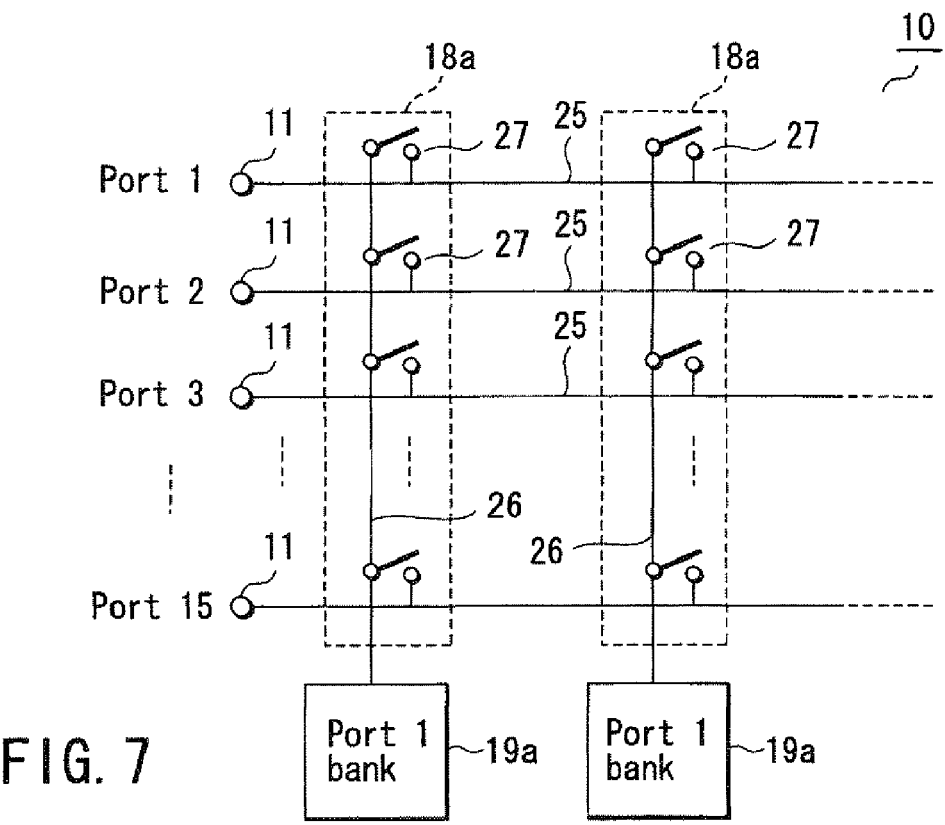
FIG. 7 is a detailed structural view when the same integrated cache is constituted by using a crossbar switch network structure.

In the integrated cache 10 according to this embodiment, port number conversion circuits 18a are positioned outside banks 19a. Additionally, this integrated cache 10 is realized by a crossbar switch network structure depicted in FIG. 7.

There are provided respective signal paths 25 of the respective first to 15th ports 11 and a plurality of signal paths 26 which are orthogonal to the respective signal paths 25 and connected to the respective banks 19a. A switch 27 which electrically conducts the both signal paths 25 and 26 is connected to an intersection between each signal path 25 and each signal path 26. The respective switches 27 and the signal path 26 constitute the port number conversion circuit 18a.

By closing the switch 27 in the port number conversion circuit 18a connected to the bank 19a which should be selected by a lower bit in an address applied to each port 11, each port 11 can be connected to an arbitrary bank 19a.

As described above, in the integrated cache 10 constituted by the crossbar switch network, since the number of ports incorporated in this integrated cache 10 can be likewise greatly reduced, it is possible to obtain substantially the same effects and advantages as those of the integrated cache 10 using the HMA structure mentioned above.

Another advantage in the integrated cache 10 according to the first and second embodiments will now be described.

Contriving conversion numbers of the port number conversion circuits 18 and 18a can obtain arbitrary port numbers, and data widths and capacities which are integral multiples with respect to data widths and capacities of the banks 19 and 19a as seen from the respective ports 11 of the respective port units 12a to 12d. However, since one integrated cache 10 is actually used, it is possible to obtain an advantage of a reduction in a cache miss ratio when the instruction cache 4 and the data cache 5 are integrated.

Figure 8:
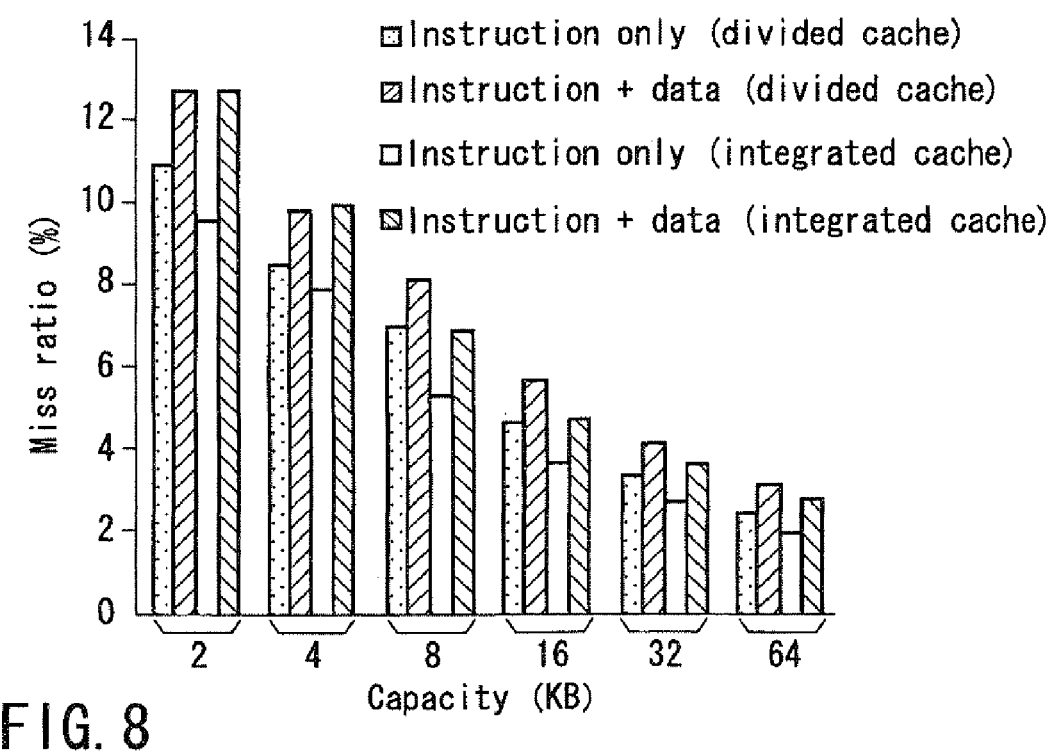
FIG. 8 is a view showing a relationship between a capacity and a miss ratio in the integrated caches according to the first and second embodiments.

FIG. 8 shows a result of calculating a cache miss ratio by using a simulator "Simple Scalar ver. 2.0" with respect to the integrated cache 10 in which the instruction cache 4 and the data cache 5 are integrated and conventional divided caches.

A horizontal axis of the graph represents a total capacity in the divided caches, which is equal to a capacity of the integrated cache. Further, the divided caches mean a conformation that the conventional instruction cache and data cache are individually provided.

As shown in FIG. 8, the miss ratio of the integrated cache is smaller than the miss ratio of the divided cache for a capacity largest than 4 KB. There is obtained a conclusion that a miss ratio of each integrated cache is substantially equal to a miss ratio of each divided cache whose capacity is approximately 1.5 fold. That is because it can be considered that a boundary between a data area of the instruction cache 4 and a data area of the data cache 5 is not determined due to integration of the two caches, lines (storage areas) in the cache can be flexibly exploited for each time, and a memory capacity optimum for each time can be again allocated. The above has demonstrated the efficacy of the multi-port integrated cache.

Incidentally, when the caches have multiple ports and are integrated, the access contention occurs between the instruction port and the data port, between the instruction ports or between the data ports, and a reduction in performance of an access processing speed in the parallel processor 13 can be also considered.

However, one cycle is enough to eliminate a penalty due to the access contention, whereas several cycles to several tens of cycles are required to rewrite data in the cache in order to eliminate a penalty due to a cache miss. Therefore, it can be said that there is no problem if an access contention probability is substantially equal to a cache miss ratio.

Figure 9:
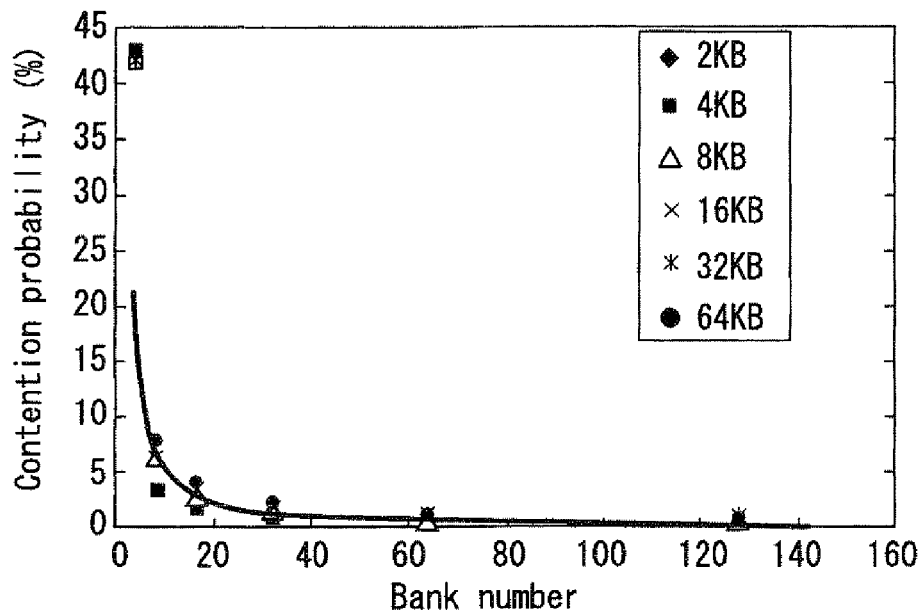
FIG. 9 is a view showing a relationship between a bank number and a contention occurrence ratio in the integrated caches according to the first and second embodiments.

Thus, trace data in a cache access was extracted from the above simulation result, and an access contention probability relative to each bank number was calculated from this trace data. FIG. 9 shows its result. Based on this result, if the bank number is not less than 16 to 32, the access contention ratio becomes substantially equivalent to the cache miss probability, and the access contention does not become a problem.

The integrated cache 10 in each embodiment is constituted based on a multi-bank architecture. In this multi-bank architecture, as shown in FIGS. 4 and 6, a high area efficiency and a high speed are achieved by using the bank structure and also using the port number conversion circuits 18 which restrict access to the respective banks 19 and 19a to one port.

Figure 10:
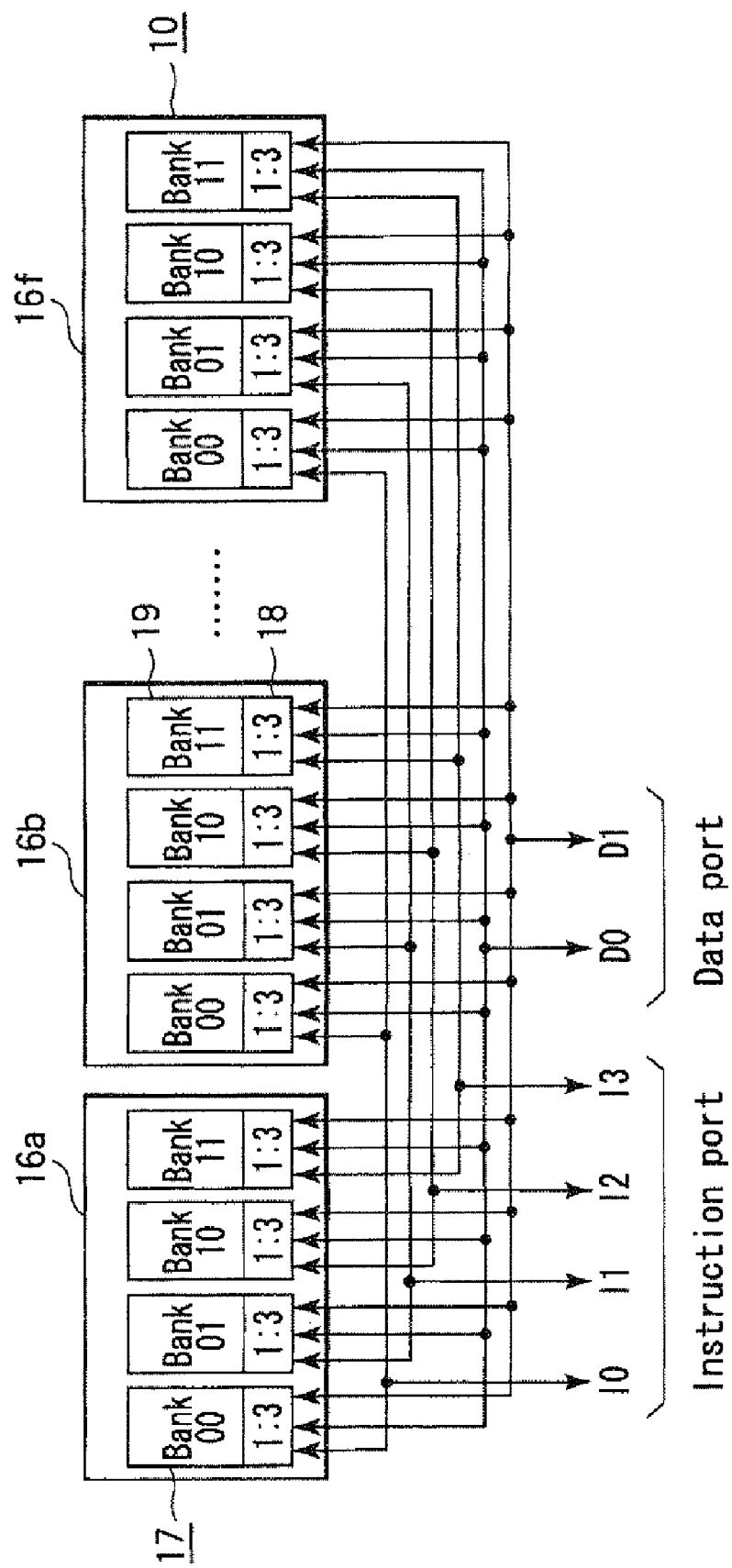
FIG. 10 is a view showing a state that the integrated cache according to the first embodiment is applied to an actual parallel processor.

For example, as shown in FIG. 10, a case that an integrated cache 10 having four instruction ports (data width; 32 bits) and two data ports (data width; 8 bits) is constituted will be verified.

For example, this integrated cache 10 has the following configuration. The instruction port is pre-decoded by lower two bits in an address of each bank 19, and can access only a specific bank 19. In case of having access to continuous addresses at the same time, the access contention does not necessarily occur. Further, having access to addresses which are not continuous is possible as long as inferior two bits in each address do not conflict with others. On the other hand, since the data port has a lower probability of having access to continuous addresses than that of the instruction port, it can access all of the 16 banks 19.

As described above, using this structure can integrate the instruction cache 4 and the data cache 5 into one integrated cache 10 without greatly lowering the access performance, and it is expected that an area cost will be approximately half of that of a case that the instruction cache 4 and the data cache 5 are individually provided in the prior art.

Third Embodiment

Figure 11:
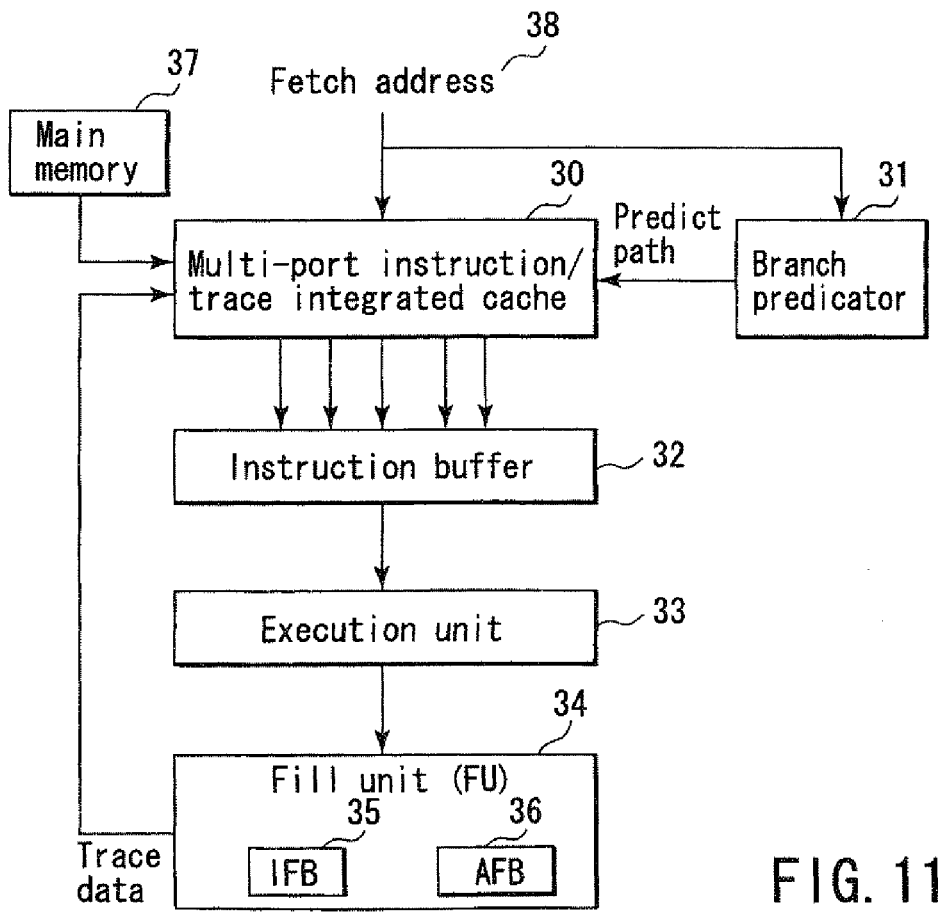
FIG. 11 is a type drawing showing a primary part of a parallel processor to which a multi-port instruction/trace integrated cache according to a third embodiment of the present invention is applied.

FIG. 11 is a type drawing showing a primary part of a parallel processor to which a multi-port instruction/trace integrated cache according to the third embodiment of the present invention is applied.

A fetch address 38 having, e.g., a 32-bit configuration outputted from a non-illustrated address generation portion in the parallel processor is inputted to a multi-port instruction/trace integrated cache 30 in which an instruction cache and a trace cache are integrated and a branch predictor 31.

Upon receiving one fetch address 38, the multi-port instruction/trace integrated cache 30 (which will be referred to as an integrated cache 30 hereinafter) simultaneously fetches four banks among a plurality of banks provided inside and issues 16 instructions of four unit blocks based on this fetch address and a predict path inputted from the branch predictor 31.

Each instruction issued from the integrated cache 30 is executed by an execution unit 33 through an instruction buffer 32. Each instruction once executed in the execution unit 33 is inputted to a fill unit 34. In this fill unit 34 are provided four instruction fill buffers (IFB) 35 and an address fill buffer (AFB) 36. When instructions for one line and address data for one line are filled in the instruction fill buffers 35 and the address fill buffer 36, these data are fed back to the integrated cache 30 as trace data. When a cache miss is generated in the integrated cache 30, instruction data in a main memory 37 is written in the integrated cache 30.

Figure 12:
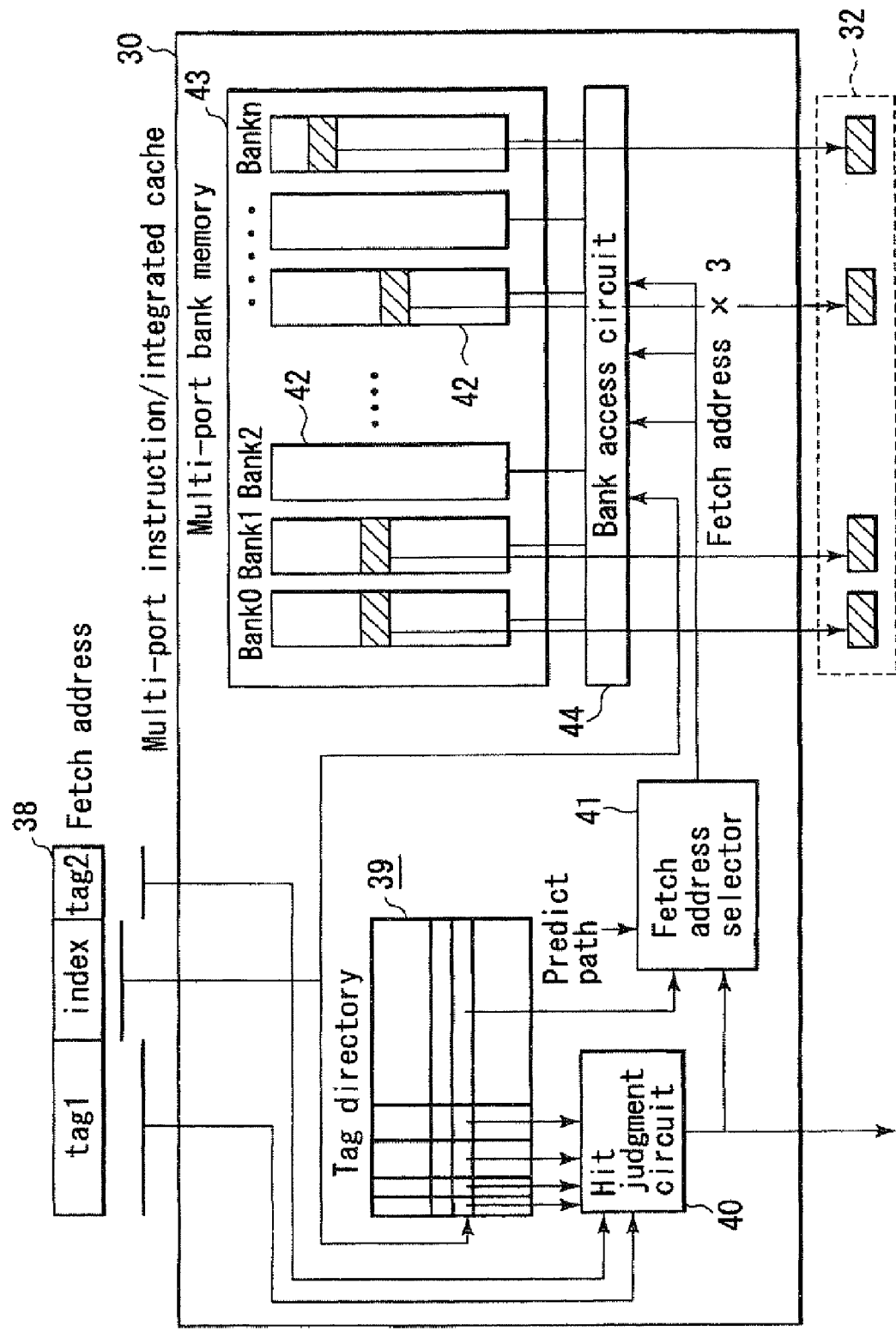
FIG. 12 is a schematic structural view of the same integrated cache.

For example, as shown in FIG. 12, in the integrated cache 30 are provided a tag directory 39, a hit judgment circuit 40, a fetch address selector 41, a multi-port bank memory 43 constituted by a plurality of banks, and a bank access circuit 44.

Figure 14:
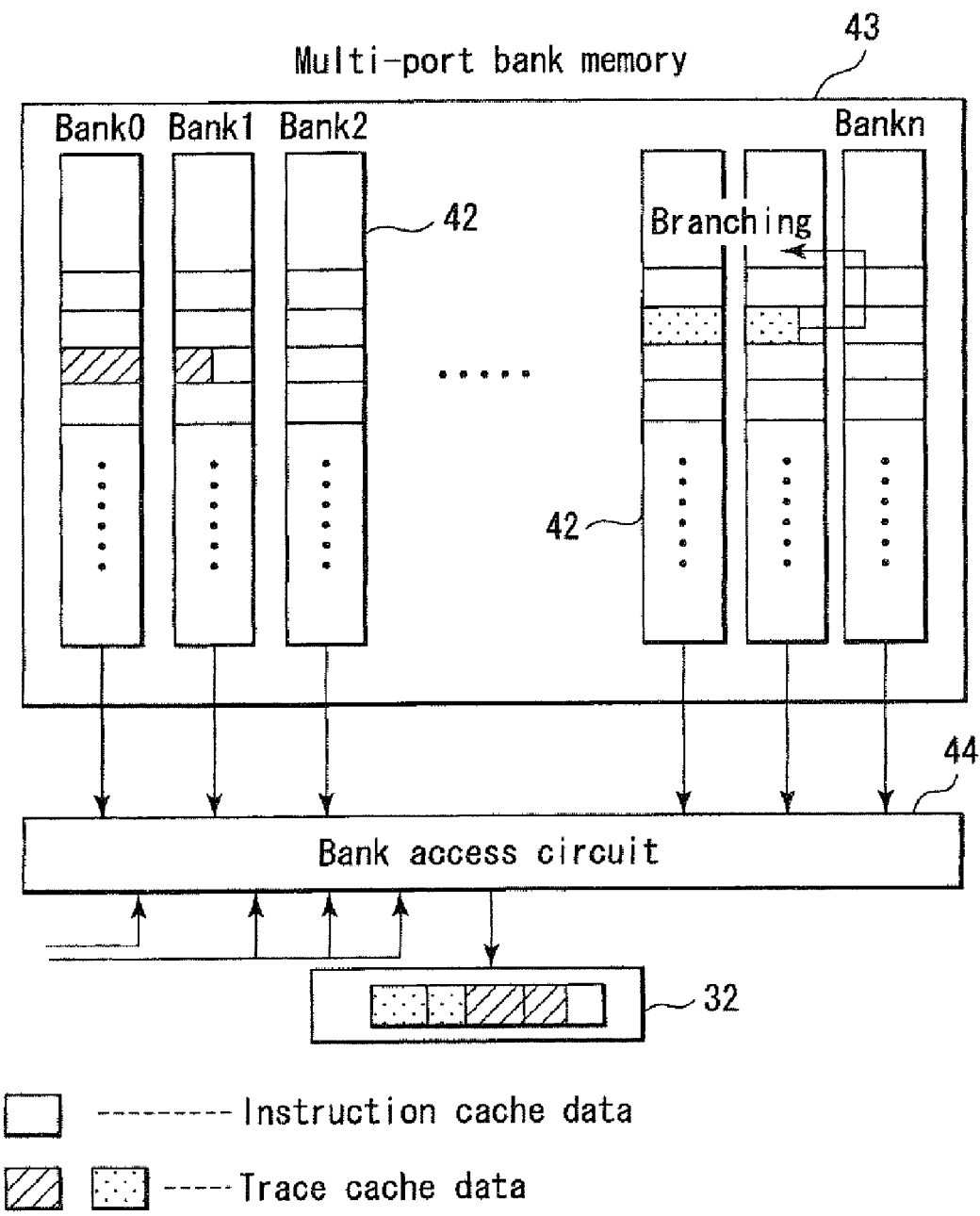
FIG. 14 is a detailed structural view of a multi port bank memory in the same integrated cache.

In each bank 42 formed in the multi-port bank memory 43, as shown in FIG. 14, a plurality of sets of instruction data are stored as independent instruction cache data in accordance with each unit block or as trace cache data together with other instruction data.

It is to be noted that this multi-port bank memory 43 and the bank access circuit 44 can be configured by using the HMA structure described in connection with the first embodiment. Furthermore, they can be realized by using the crossbar switch network structure described in conjunction with the second embodiment.

Figure 13:
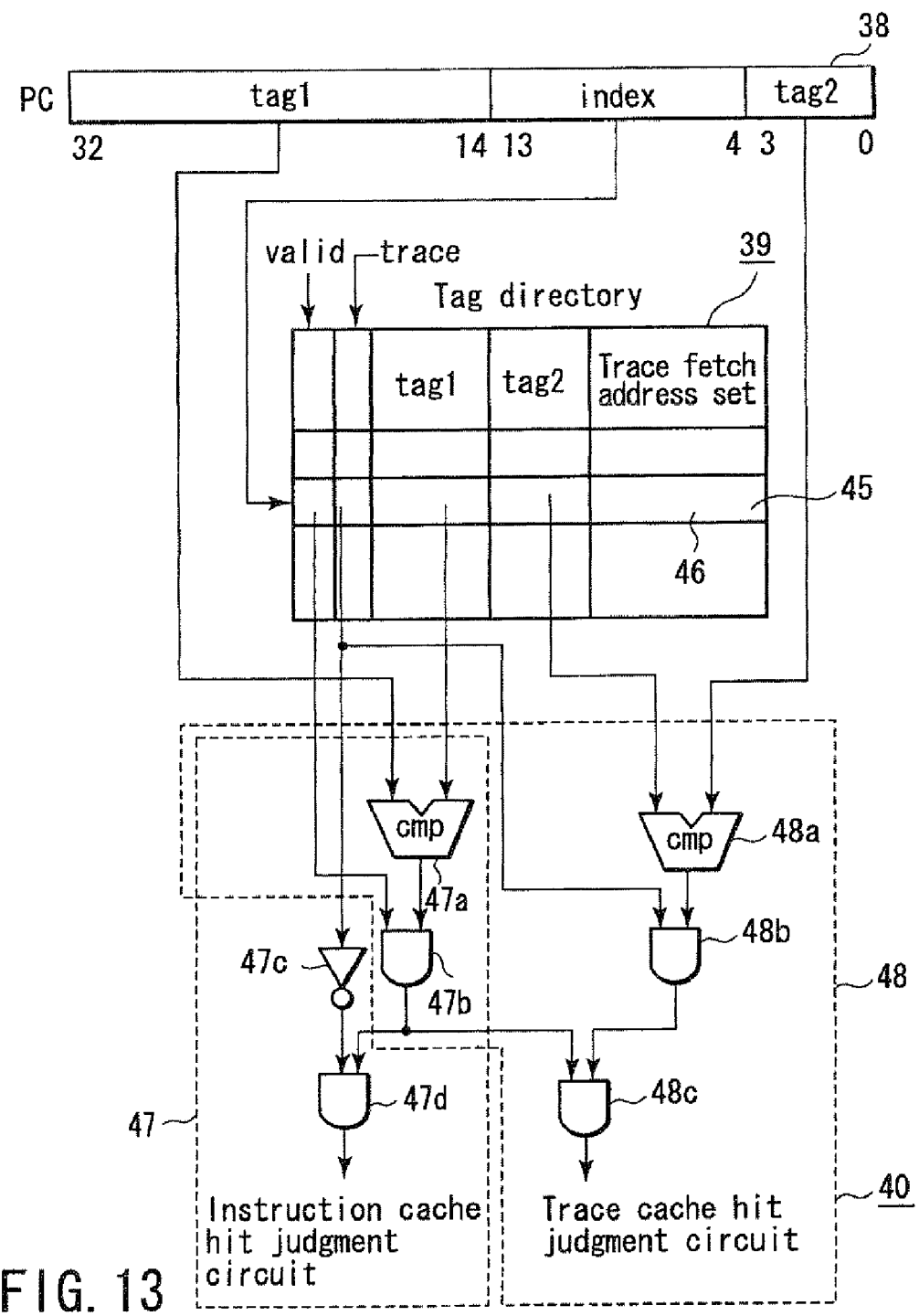
FIG. 13 is a detailed structural view showing a tag directory and a hit judgment circuit in the same integrated cache.

FIG. 13 is a detailed structural view showing the tag directory 39 and the bit judgment circuit 40. The fetch address 38 has a tag 1 set in a high-order bit, an index set in a middle-order bit and a tag 2 set in a low-order bit.

In the tag directory 39, an area 45 specified by each index has stored therein a valid bit indicating that this area 45 is valid, a trace bit as an identification bit indicative of data from the trace cache, a tag 1, a tag 2 which specifies a top address in case of data from the trace cache, and a set 46 of trace fetch addresses inputted as trace data from the address fill buffer 36 of the fill unit 34.

The bit judgment circuit 40 is constituted by an instruction cache hit judgment circuit 47 and a trace cache hit judgment circuit 48. The instruction cache hit judgment circuit 47 is formed by a comparator 47a, an AND gate 47b, an inverter 47c, and an AND gate 47d. Moreover, when the valid bit in the area 45 is valid, the trace bit is invalid and the tag 1 matches with the tag 1 in the fetch address 38, the data of the instruction cache is hit.

On the other hand, the trace cache hit judgment circuit 48 is constituted by comparators 47a and 48a and AND gates 47b, 48b and 48c. Additionally, when the valid bit in the area 45 is valid, the trace bit is valid and the tags 1 and 2 match with the tags 1 and 2 in the fetch address 38, the data of the trace cache is hit.

When the both data in the trace cache and the instruction cache are hit, the hit judgment circuit 40 outputs the data from the trace cache.

Based on this mode, a destination of storage of the data from the trace cache and the data from the instruction cache can be set as the trace fetch address set 46 in the area 45 specified by the same index in this tag directory 39. Therefore, the inputted fetch address can be efficiently substituted by a plurality of instructions, and it is possible to solve a problem that overlapping instruction strings exist which is a drawback in the case that the conventional trace and instruction caches are provided.

In FIG. 12, hit information of the trace cache or the instruction cache outputted from the hit judgment circuit 40 is supplied to a fetch address selector 41. When the inputted hit information is hit information from the trace cache judgment circuit 48, the fetch address selector 41 selects a plurality of fetch addresses used to read data in a bank 42 specified by a predict path outputted from the branch predictor 31 from the trace fetch address set 46 in the area 45 specified by the index in the tag directory 39, and supplies them to the bank access circuit 44. That is, when a top address of the trace data is specified by the two tags 1 and 2, the fetch addresses of the respective data following this top address are selected.

The bank access circuit 44 reads data (instruction data) for each one unit block in each bank 42 specified by each inputted fetch address, and outputs it to the instruction buffer 32.

Further, when the inputted hit information is hit information from the instruction cache judgment circuit 47, the trace data does not exist, and hence the fetch address selector 41 accesses four continuous banks 42 from a bank specified by the tag 1 and the index, reads data (instruction data) for each one unit block and outputs it to the instruction buffer 32.

Subsequently, a description will now be given as to a method for generating the trace fetch address set 46 written in the area 45 of the tag directory 39 in the integrated cache 30 from the address fill buffer (AFB) 36 of the fill unit 34.

When the integrated cache 30 adopts a bank structure, since the trace data is stored in each bank 42 in units of basic block, a trace is generated by fetching banks according to a branch predict from a plurality of the banks 42. Therefore, addresses of these banks 42 must be issued. A description will now be given as to a method for generating addresses of the banks 42 accessed by utilizing this method in order to confirm an instruction execution history in the trace cache.

In general, when utilizing the trace cache, a series of instruction strings from a branch target point to a branch instruction are stored in the cache by combining instruction strings once executed in the execution unit 33 by the fill unit 34. This series of instruction strings will be referred to as a "pseudo-basic block" hereinafter. By confirming a size of the "pseudo-basic block", a part which is predicted to be continuously accessed can be extracted from a past history.

Since the instructions are stored in the trace cache in units of this "pseudo-basic block", only one branch instruction exists in one line. Therefore, in each line, one bank 42 as a branch destination is accessed if branching is carried out, and continuous banks 42 are accessed if branching is not carried out or a branch instruction does not exists.

Figure 15:
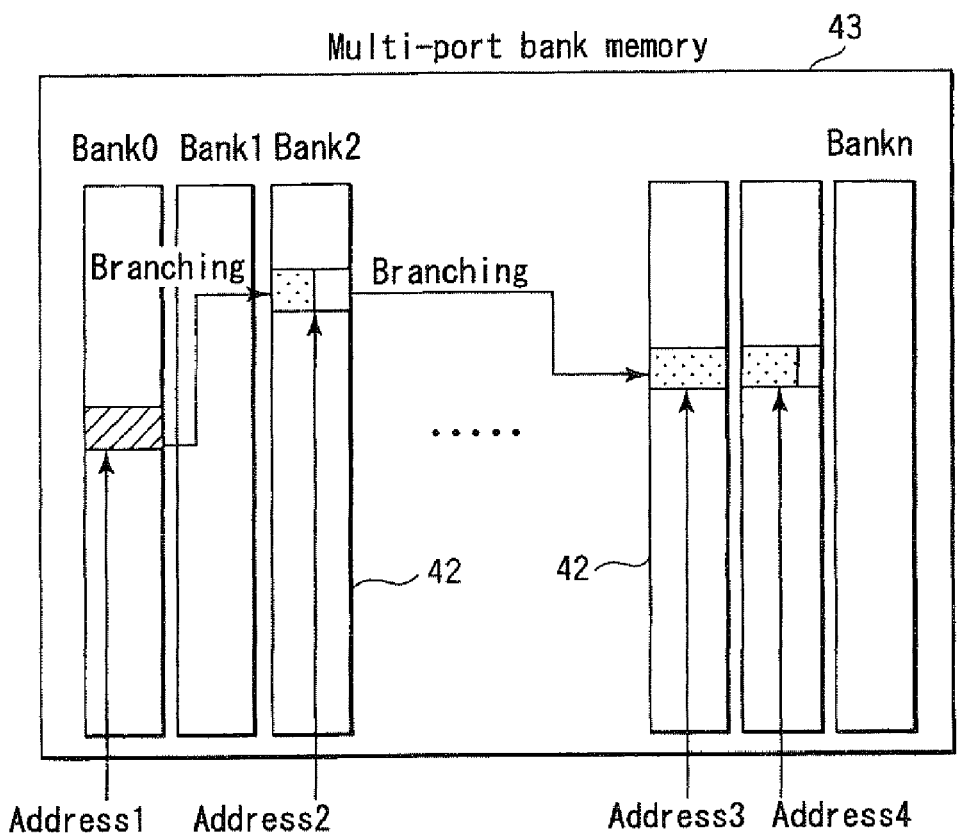
FIG. 15 is a view showing an address specification state relative to each bank in the same integrated cache.

FIG. 15 shows a detail of fetch of the trace in the multi-port bank memory 43 in units of line. The "pseudo-basic block" which exists in a bank 0 at the beginning of the trace starting from an address 1 branches to an address 2 of a bank 2, and then branches to an address 3.

In order to issue the addresses 1, 2 and 3, a branch predict must be performed and information indicating which bank 42 is predicted is required. In order to realize this mode, the four instruction fill buffers (IFB) 35 and the address fill buffer (AFB) 36 are provided in the fill unit 34 which combines the executed instruction strings for the purpose of dividing the addresses and the instruction data as described above.

Figure 18:
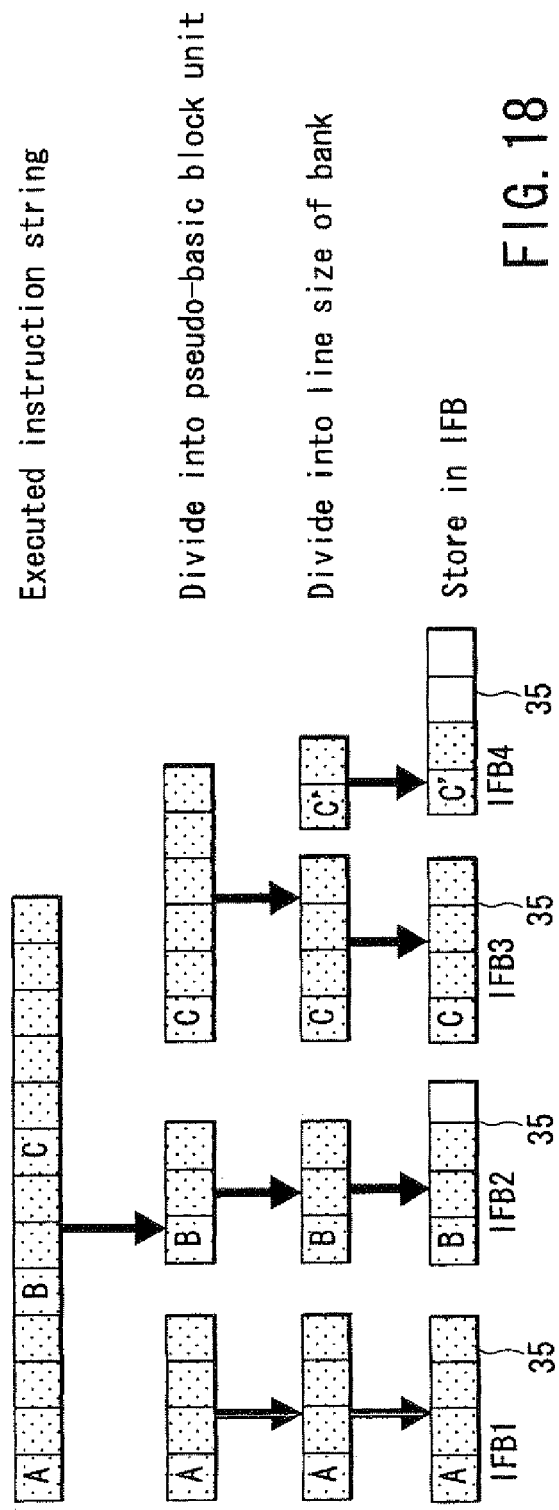
FIG. 18 is a view showing a storage content of an instruction fill buffer of a parallel processor to which the same integrated cache is applied.
Figure 20:
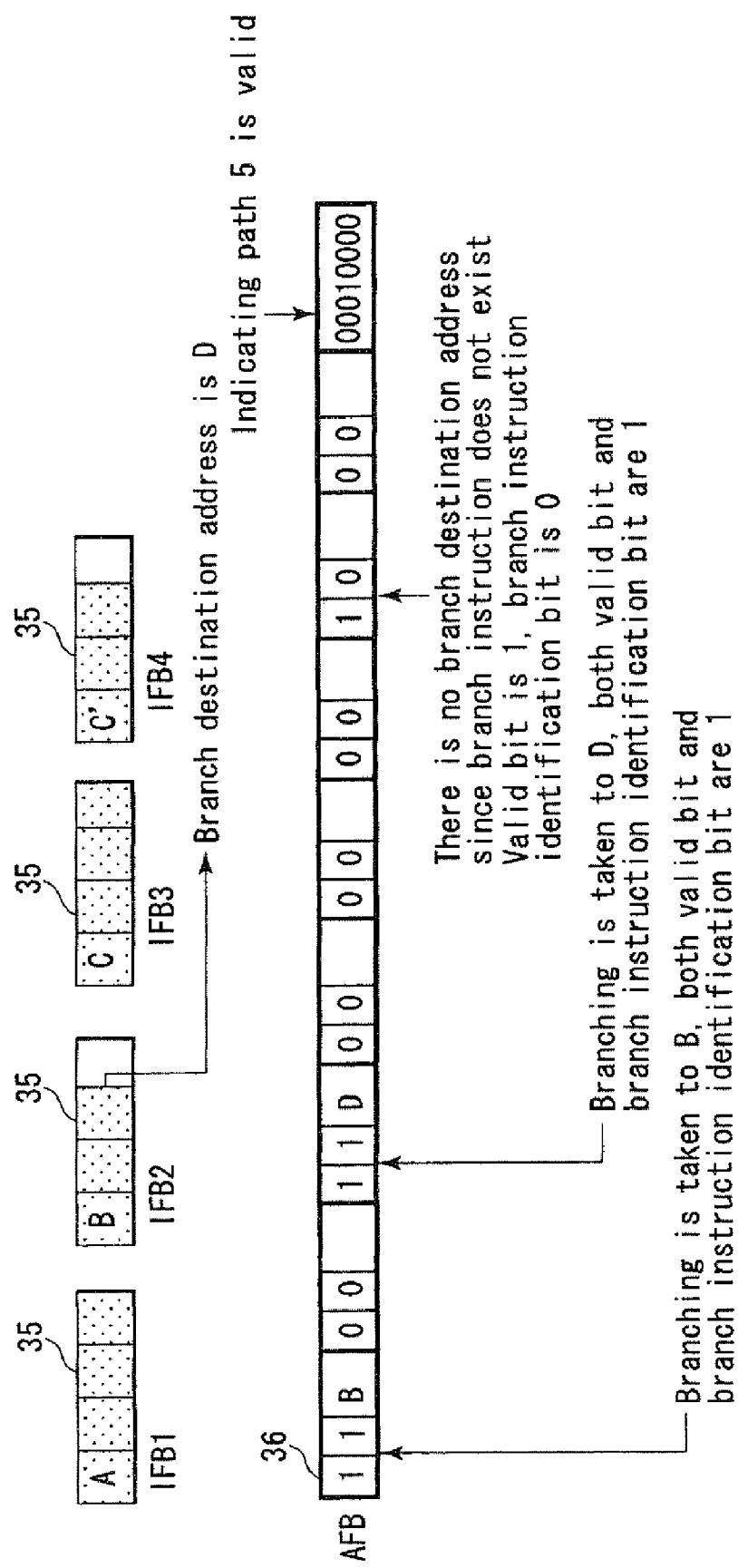
FIG. 20 is a view showing a storage content of an address fill buffer of the parallel processor to which the same integrated cache is applied.
Figure 21:
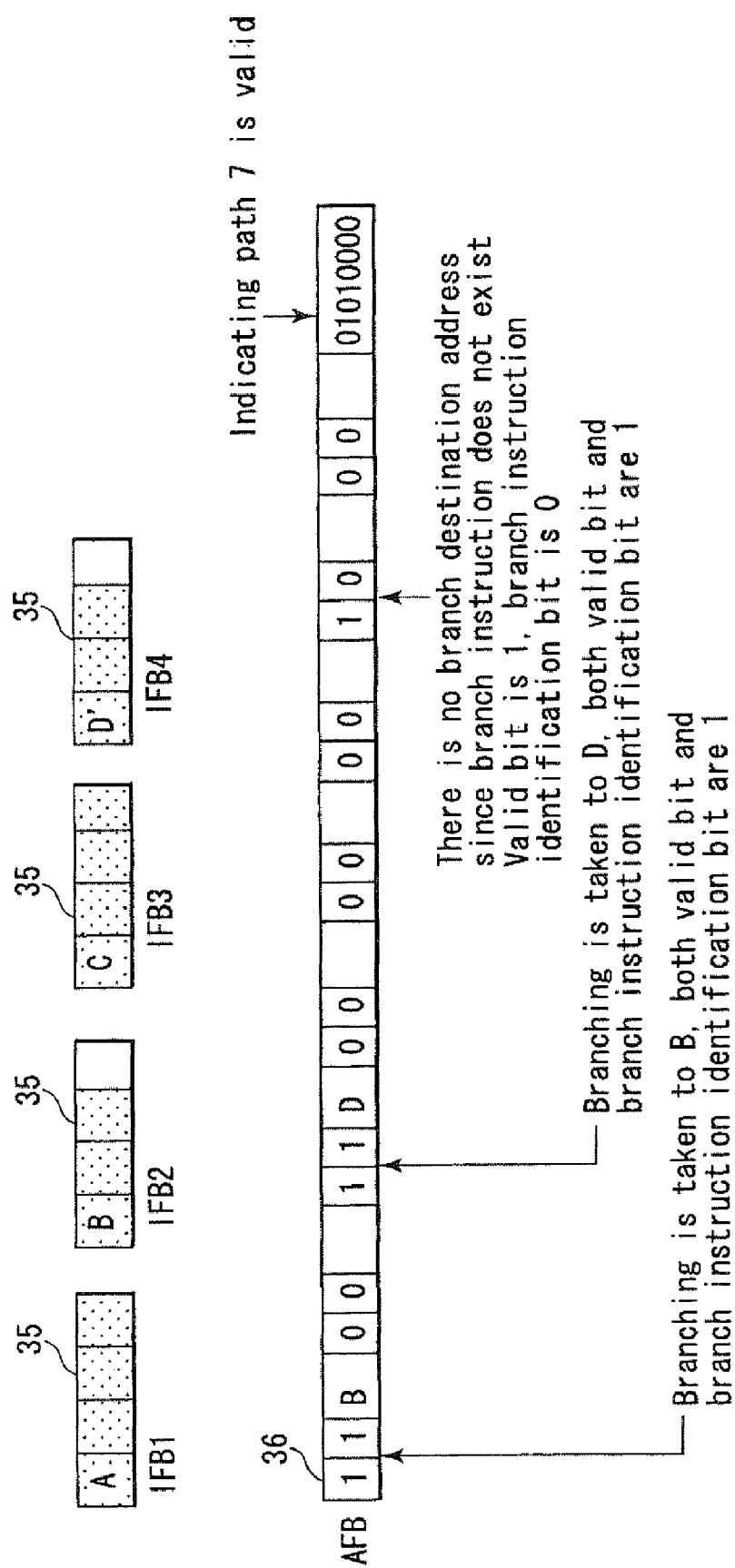
FIG. 21 is a view showing a storage content of the address fill buffer of the parallel processor to which the same integrated cache is applied.

The instruction fill buffer (IFB) 35 stores therein the executed instruction data as mentioned above. Since the execution unit 33 simultaneously executes 16 instructions as described above and one line of each bank 42 corresponds to four instructions, a total of four instruction fill buffers 35 are provided for each four instructions as shown in FIGS. 18, 20 and 21.

The address fill buffer (AFB) 36 stores therein a set of a series of addresses of the "pseudo-basic blocks" which generate the trace as described above. That is, the address fill buffer (AFB) 36 has a function to integrate a plurality of fetch addresses which may be possibly fetched into one for the cache utilizing the bank structure. Furthermore, respective addresses of the instructions are inputted to the address fill buffer (AFB) 36.

In case of combining the instructions in units of bank in the trace cache, one branch instruction exist or not in the line of each bank 42. Bank 42 branches from bank 42 which includes branch instruction is continuous in case that branching is not taken, and is a branch destination target in case that branching is taken. Line which excludes branch instruction accesses continuous bank always.

Figure 16:
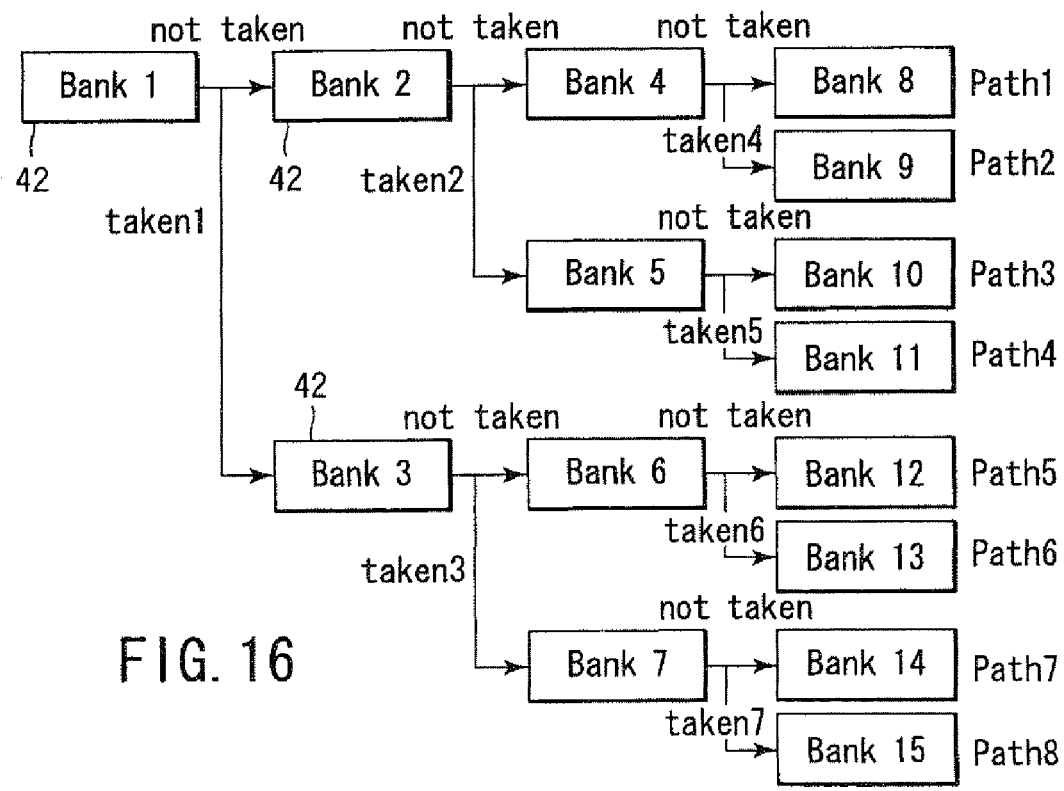
FIG. 16 is a view showing a branch destination of each bank in the same integrated cache.

Therefore, when simultaneously reading the four banks 42 at the time of fetch in the address fill buffer (AFB) 36, there can be considered a total of eight paths from a path 1 extending from the bank 1 to the bank 8 to a path 8 extending from the bank 1 to the bank 15 as shown in FIG. 16.

Figure 17:
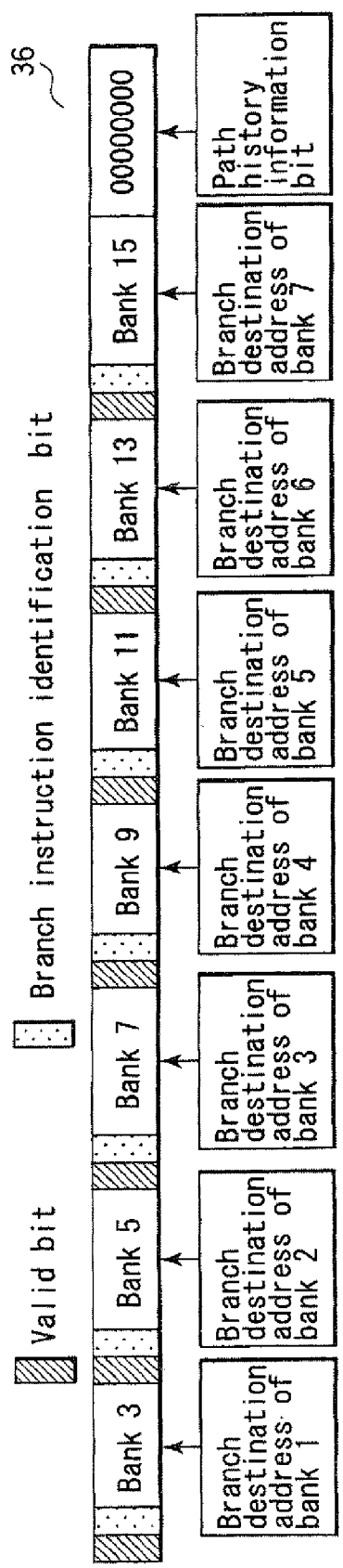
FIG. 17 is a view showing a storage content of an address fill buffer of a parallel processor to which the same integrated cache is applied.

Since there is a possibility that a branch destination target exists in each bank 42, the address fill buffer (AFB) 36 can store therein seven addresses as shown in FIG. 17. Moreover, to each address in the address fill buffer (AFB) 36 are added a valid bit and a branch instruction identification bit indicating whether a branch instruction is taken since a branch instruction may not be taken in the line of the bank 42. Additionally, path history information bits consisting of eight bits indicative of a stored path history are also provided in the address fill buffer (AFB) 36.

FIG. 18 shows a storage state in the instruction fill buffer (IFB) 35 used to store the executed instruction data. It is assumed that a total of 13 instructions, i.e., four A basic blocks, three B basic blocks and six C basic blocks are executed. The 13 instructions are divided into three "pseudo-basic blocks" consisting of the four A basic blocks, the three B basic blocks and the six C basic blocks. Additionally, each "pseudo-basic block" is divided into line sizes of the bank 42 configured by four unit blocks. In this state, they are stored in the respective four instruction fill buffers (IFB) 35.

Figure 19:
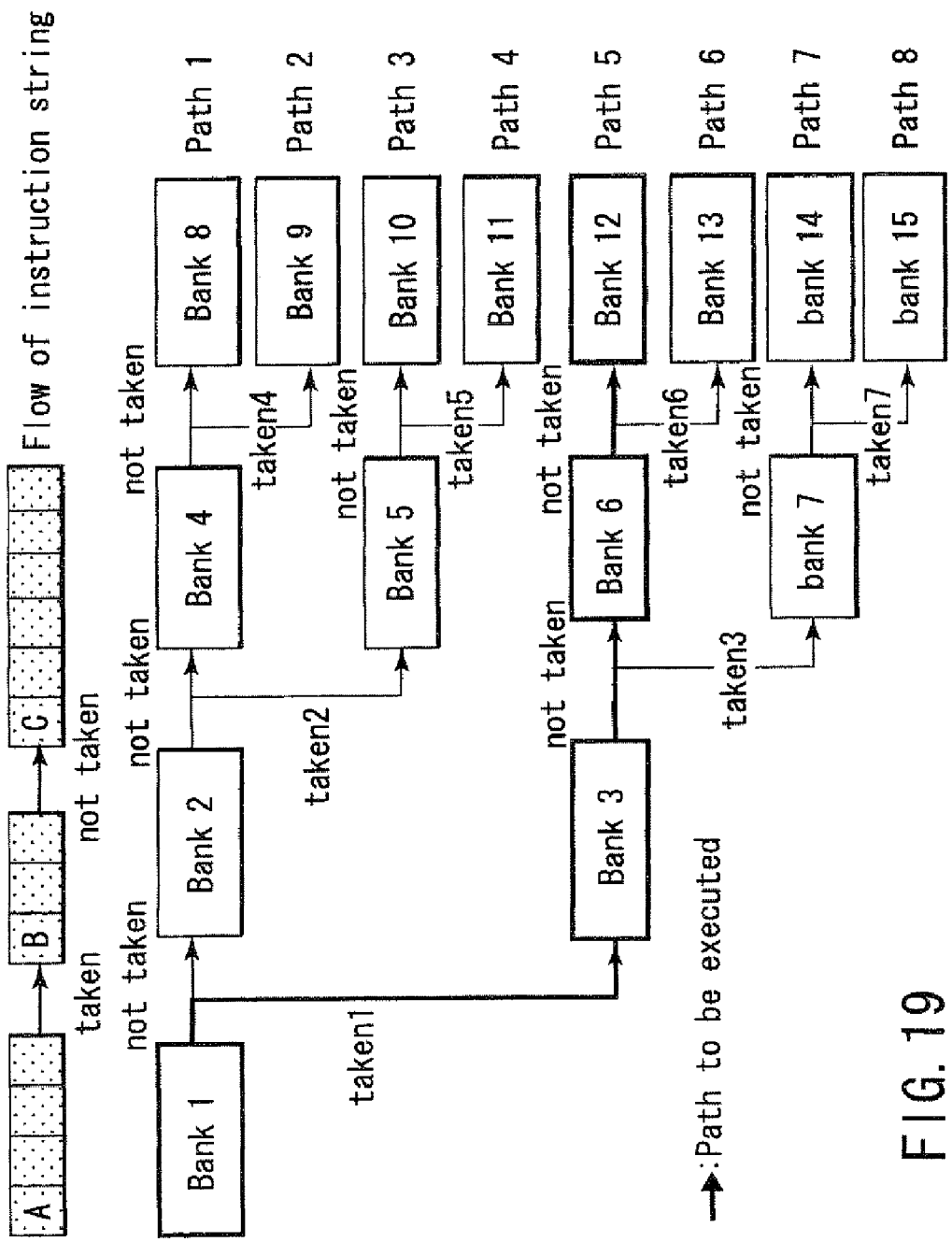
FIG. 19 is a view showing a path executed by the parallel processor to which the same integrated cache is applied.

A description will now be given as to a state of each address stored in the address fill buffer (AFB) 36 when the instruction strings depicted in FIG. 18 are executed. As shown in the upper part of FIG. 19, as to the currently combined instruction string, since the first branch instruction is taken and the second branch instruction is not taken, such a path as indicated by a bold line is executed. Since a branch instruction does not exist from the bank 6 to the bank 12, the continuous banks are accessed like a case that the branch instruction is not achieved because the branch instruction does not exist in the bank 6.

When the current path is executed, the addresses are combined in the address fill buffer (AFB) 36 by a result of execution as shown in FIG. 20. Since the executed path is a path 5, a fifth bit in the path history information bits is determined as 1 and its path is determined as valid.

In the executed path, branching from the B basic block to the C basic block is not achieved. However, the branch instruction of the B basic block is executed, and a branch destination address is calculated. Therefore, an address of D as a destination when branching is achieved is stored in case that the branch instruction of the B basic block is taken.

Since branch information of the unexecuted bank is unknown, the valid bit is determined as 0 and the instruction cannot be issued. If the A basic block does not branch, the continuous banks are read from A, and information of the subsequent bank is unknown. Therefore, continuous addresses are issued and the instructions are fetched. At this time, information can be newly added to the address fill buffer (AFB) 36 by holding the information in the address fill buffer (AFB) 36 and confirming the executed instruction strings.

Figure 22:
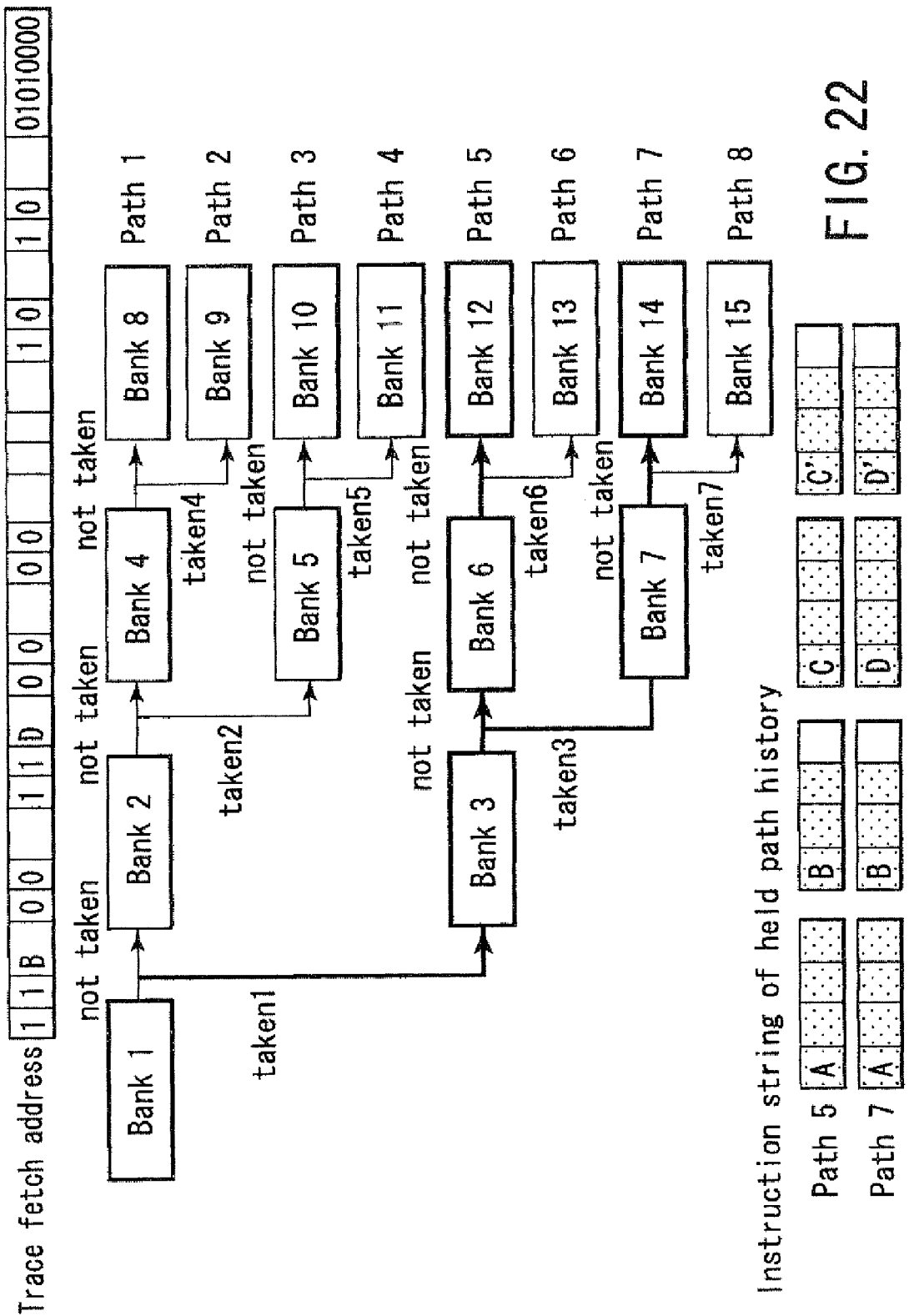
FIG. 22 is a view showing a path executed by the parallel processor to which the same integrated cache is applied.

FIG. 21 shows a storage state of addresses with respect to the address fill buffer (AFB) 36 when the current information depicted in FIG. 20 is held and the basic blocks A, B and D are executed. In this case, as shown in FIG. 22, since the executed path is a path 7, the seventh bit in the path history information bits is determined as 1.

By repeating this operation, a history of the paths of the instructions can be stored and extracted. Therefore, when the trace is stored, the instruction data of the trace of the instruction fill buffer (IFB) 35 is stored in the cache (each bank 42 of the multi-port bank memory 43), and the respective addresses in the address fill buffer (AFB) 36 are stored as the fetch address set 46 in the corresponding area 45 of the tag directory 39.

Only the same instruction strings as the execution history can be sufficiently issued when the instruction strings are executed just once. In the trace cache in which the bank structure is not carried out, since the instruction strings are physically continuously stored in accordance with the history, the instructions must be stored every time the path is changed. However, like the integrated cache 30 according to the embodiment, when the bank structure is utilized, if the address fill buffer (AFB) sufficiently holds information, the instructions can be flexibly issued.

This will now be described by using a method for fetching the continuous banks 42 by actually utilizing the trace fetch addresses. As shown in FIG. 22, a history of the path 5 and the path 7 is held, the instructions can be successfully issued with respect to these two paths. When these paths follows the branch predict and the path 1 is subsequently executed, only the A basic block is issued, and continuous addresses are fetched from A in the next cycle. In this case, although the instructions cannot be temporarily sufficiently issued, the successful instruction issue is possible in case of the paths 1, 5 and 7 next time by again overwriting the address fill buffer (AFB) 36 after execution of this path.

Fourth Embodiment

Figure 23:
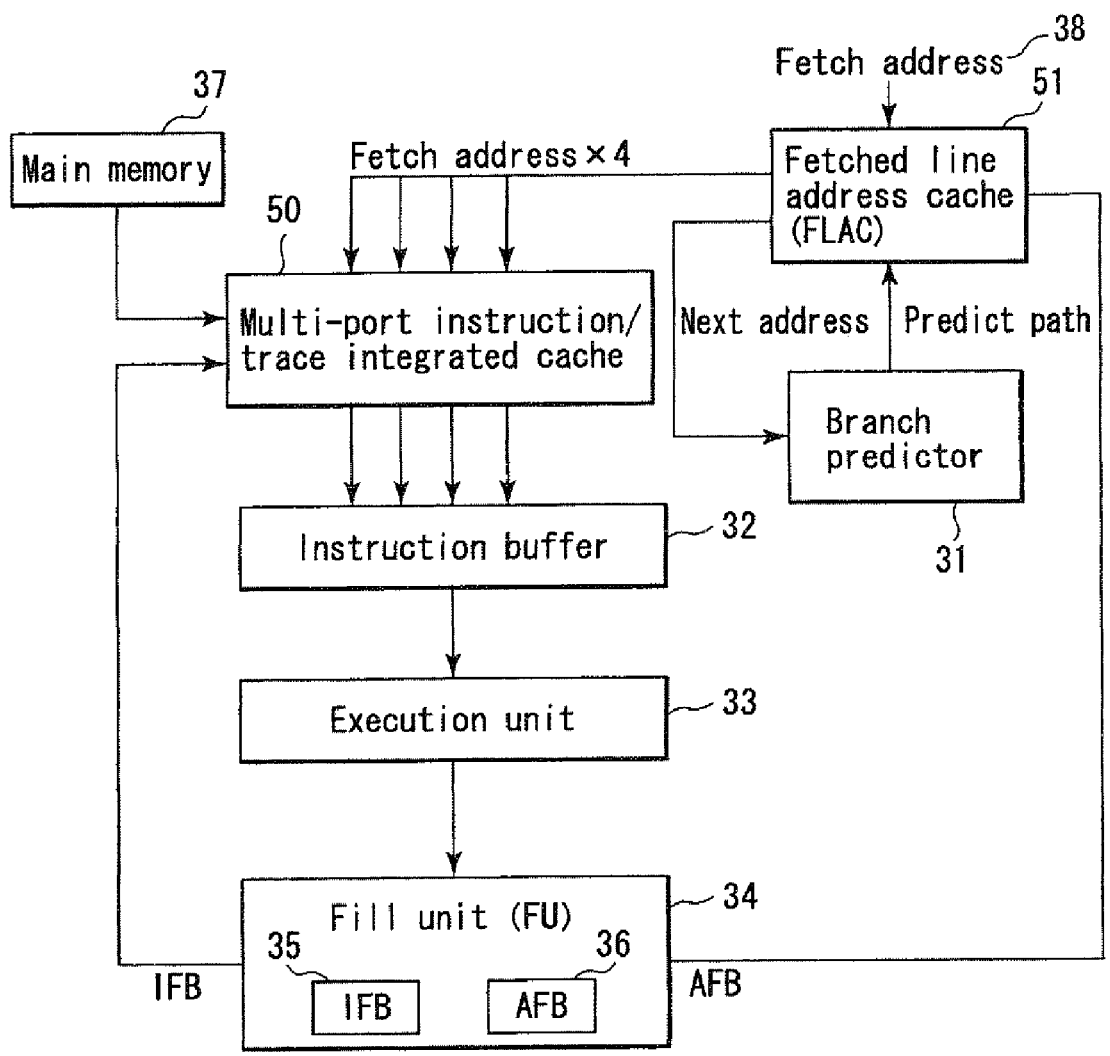
FIG. 23 is a type drawing showing a primary part of a parallel processor to which a multi-port instruction/trace integrated cache according to a fourth embodiment of the present invention is applied.

FIG. 23 is a type drawing showing a primary part of a parallel processor to which a multi-port instruction/trace integrated cache according to a fourth embodiment of the present invention is applied. Like reference numerals denote parts equal to those in the primary part of the parallel processor to which the multi-port instruction/trace integrated cache according to the third embodiment shown in FIG. 11 is applied. The detailed explanation of the same parts will be eliminated.

In this fourth embodiment, a fetched line address cache (FLAC) 51 is provided. Further, each address stored in the address fill buffer (AFB) 36 in the fill unit 34 is supplied to the fetched line address cache (FLAC) 51 instead of the multi-port instruction/trace integrated cache 50 (which will be referred to as an integrated cache 50 hereinafter).

Upon receiving a fetch address 38 from a non-illustrated address generation portion in the parallel processor, the fetched line address cache (FLAC) 51 supplies to the integrated cache 50 a total of four fetch addresses, i.e., the fetch address 38 and three fetch addresses selected from a plurality of addresses inputted from the address fill buffer (AFB) 36 by using a predict path of the branch predictor 31.

Figure 25:
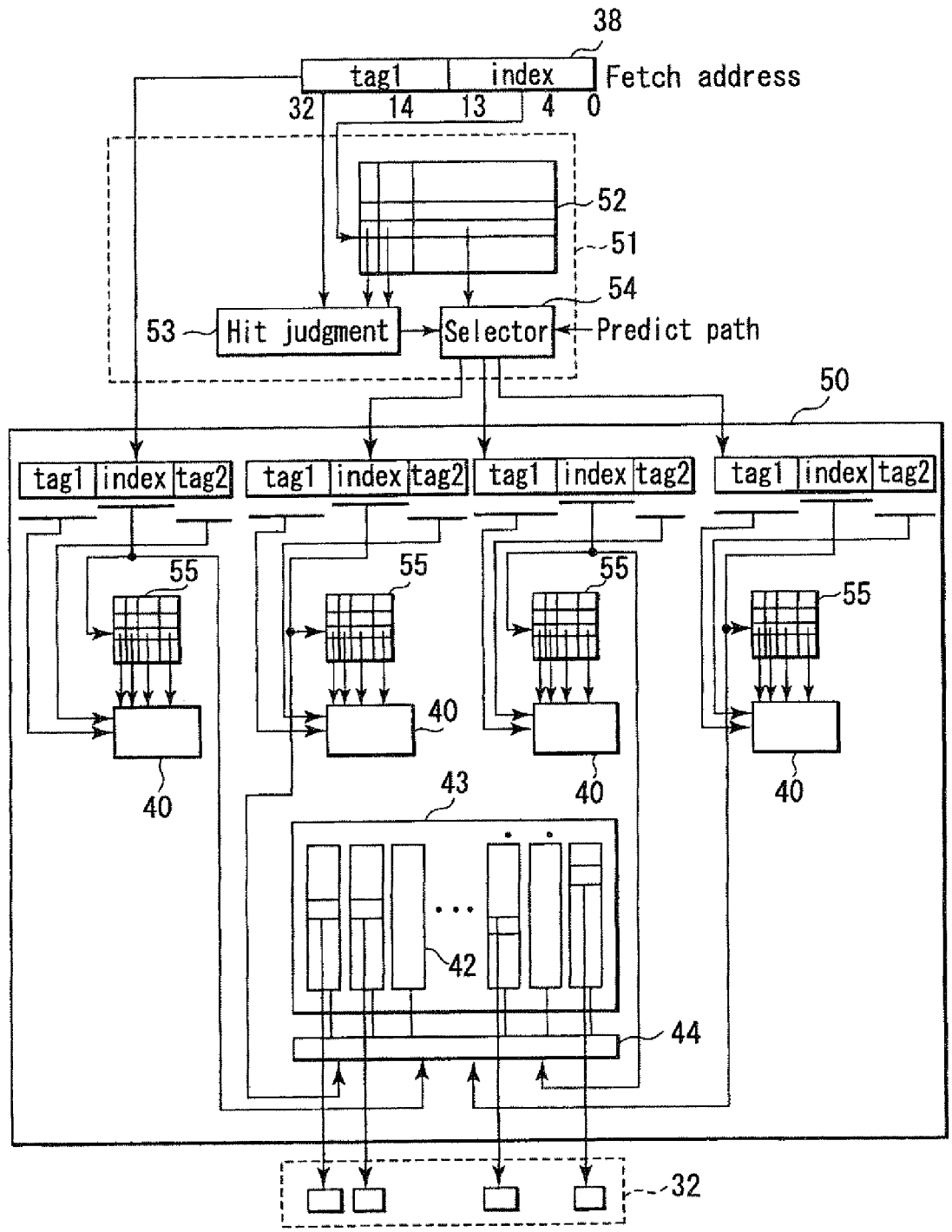
FIG. 25 is a schematic structural view of the same integrated cache.
Figure 26:
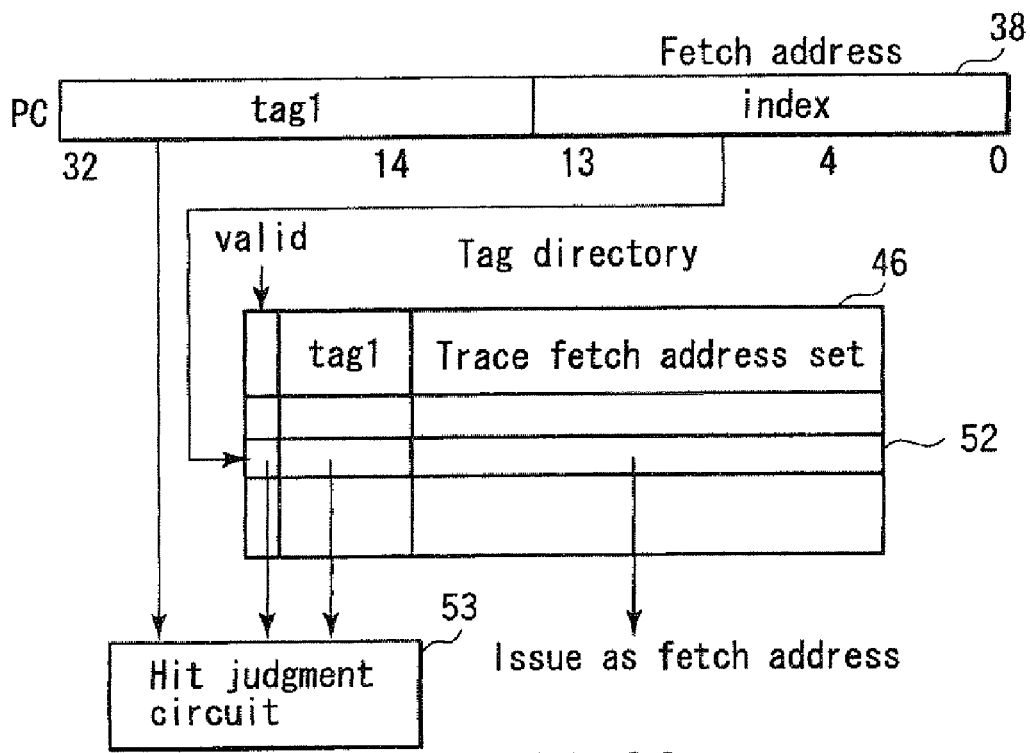
FIG. 26 is a detailed structural view of a tag directory and a hit judgment circuit in the same integrated cache.

FIG. 25 is a detailed structural view showing the fetched line address cache (FLAC) 51 and the integrated cache 50. In the fetched line address cache (FLAC) 51 are provided a tag directory 52, a hit judgment circuit 53 and a fetch address selector 54. A tag 1 and a trace fetch address set 46 consisting of a plurality of addresses inputted from the address fill buffer (AFB) 36 are written in an area specified by an index of the fetch address 38 of the tag directory 52 as shown in FIG. 26.

When the hit judgment circuit 53 has a hit, the fetch address selector 54 selects three fetch addresses from the trace fetch address set 46 based on a predict path of the branch predictor 31, and supplies them to the integrated cache 50. Furthermore, the fetched line address cache (FLAC) 51 supplies the inputted fetch address 38 to the integrated cache 50 as it is.

In the integrated cache 50 are provided four tag directories 55 in accordance with the respective inputted four fetch addresses. A valid bit, a trace bit indicative of data from the trace cache, a tag 1, and a tag 2 indicative of a top address in case of the data from the trace cache are provided in an area specified by an index of the fetch address in each tag directory 55.

When the hit judgment circuit 40 has a hit, an index part of a corresponding fetch address is determined as a fetch address and it is supplied to a bank access circuit 44 of a multi-port memory 43. Then bank access circuit 44 reads data (instruction data) for each one unit block in the bank 42 specified by each inputted fetch address and outputs it to an instruction buffer 32.

A characteristic of the integrated cache 50 according to the fourth embodiment having such a structure will now be described.

Figure 24:
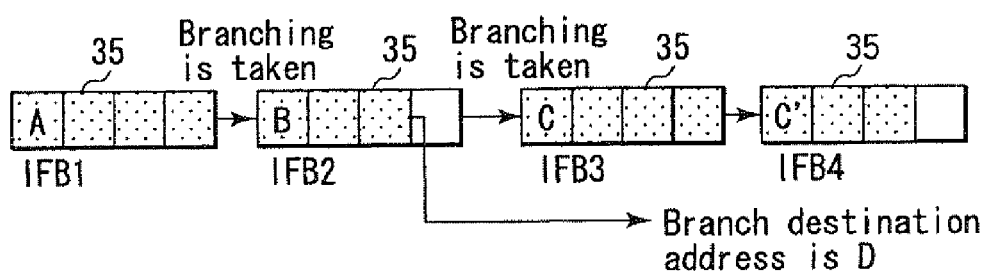
FIG. 24 is a view illustrating an effect of the same integrated cache.

In the above-described integrated cache 30 according to the third embodiment, fetch to a part where the trace fetch address is valid is performed. Like the instruction fill buffer (IBF) 35 shown in FIG. 24, as to the trace fetch address, it is assumed that branching of the "pseudo-basic block" of A is taken, branching of the "pseudo-basic block" of B is not taken and information of a path following the basic block of C is held. In this case, if it is predicted that the B basic block branches to D, instructions of only the A and B basic blocks that a content of the trace is guaranteed are fetched.

However, since the D basic block may possibly hold instruction cache data, it is desirable to also issue an address of D and simultaneously issue instructions in case of a hit.

Therefore, only one address is issued with respect to the integrated cache 30 in the third embodiment, whereas four addresses are issued with respect to the integrated cache 50 in the fourth embodiment. Accordingly, the integrated cache 50 has four multiplexed tag directories 55. Moreover, the fetched line address cache (FLAC) 51 generates fetch addresses for four fetches.

In the fourth embodiment, a top address of the fetch is first accessed by the fetched line address cache (FLAC) 51. When the top address of the fetch is hit by the fetched line address cache (FLAC) 51, corresponding four addresses are issued to the integrated cache 50 from the fetched line address cache (FLAC) 51.

Since the addresses issued from the fetched line address cache (FLAC) 51 form a set of addresses which can be possibly fetched, an addresses to be fetched is selected in accordance with a branch predication. As a top address, the same address as that used when accessing the fetched line address cache (FLAC) 51 is inputted.

That is, in this fourth embodiment, upon receiving the fetch address 38 from the address generation portion of the parallel processor, the fetched line address cache (FLAC) 51 issues an address used to generate a trace. Further, even when it is predicted that branching occurs in a direction of a trace which is not executed by the address fill buffer (AFB) 36 based on the branch prediction, the fetched line address cache (FLAC) 51 issues that address. As a result, it is possible to simultaneously confirm whether data is held in the instruction cache.

However, since the integrated cache 50 must compare the tags by using the four addresses, four tag directories 55 are provided. The integrated cache 50 accepts these four addresses, and performs a hit judgment. If the basic block which is not guaranteed as a trace fetch address is hit, that instruction string is also simultaneously subjected to instruction fetch. Based on this mode, it is possible to simultaneously fetch the instruction string the first half of which is the trace data and the last half of which is data of the instruction cache which is executed for the first time.

Fifth Embodiment

Figure 27:
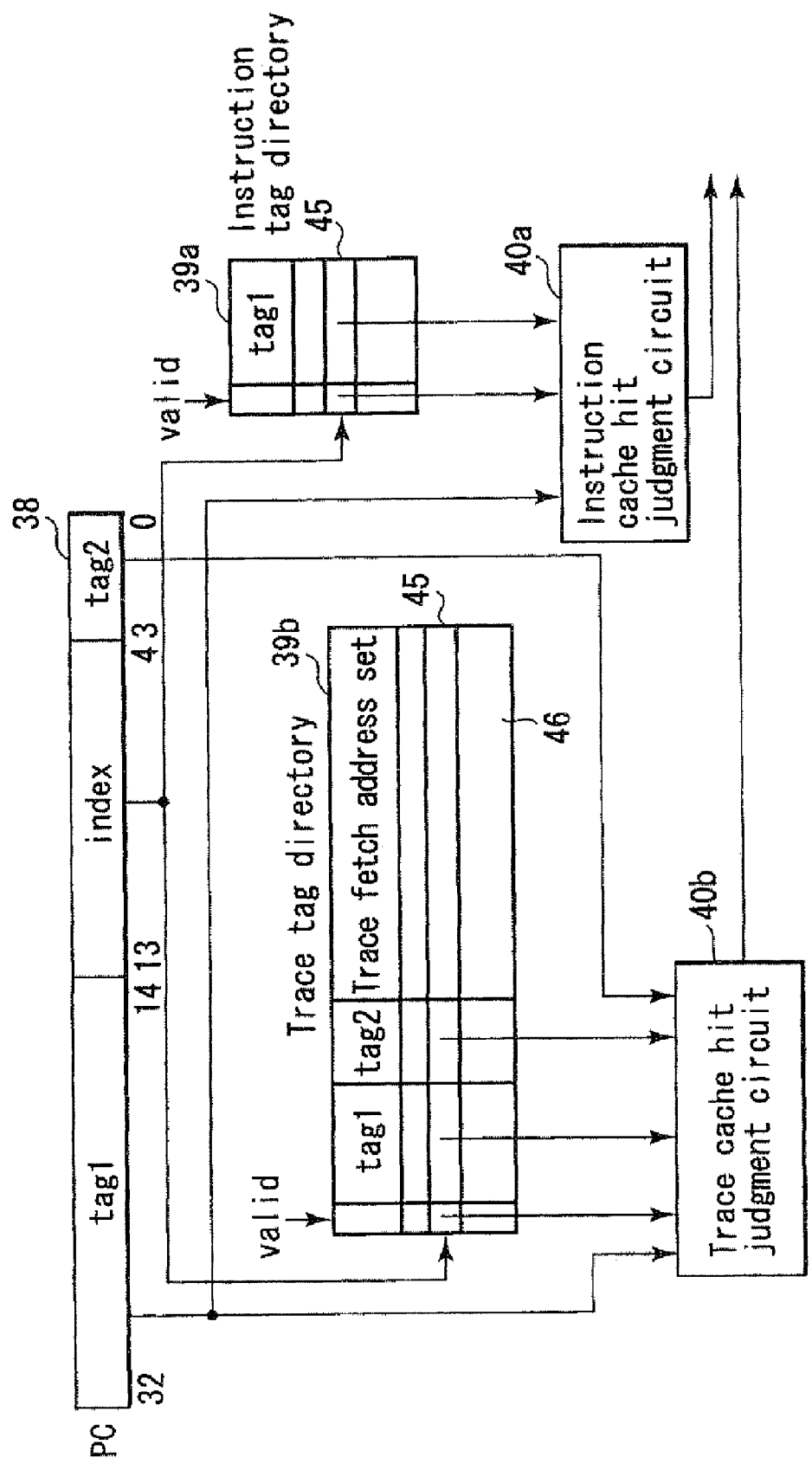
FIG. 27 is a schematic structural view of a multi-port instruction/trace integrated cache according to a fifth embodiment of the present invention.

FIG. 27 is a block diagram showing a primary part of a multi-port instruction/trace integrated cache according to a fifth embodiment of the present invention. Like reference numerals denote parts equal to those of the multi-port instruction/trace integrated cache 30 according to the third embodiment depicted in FIG. 12. The detailed explanation of the same parts are eliminated.

In the multi-port instruction/trace integrated cache 30 according to the fifth embodiment, the tag directory 39 in the multi-port instruction/trace integrated cache 30 according to the third embodiment depicted in FIG. 12 is divided into an instruction tag directory 39a and a trace tag directory 39b.

Furthermore, in each area 45 specified by an index of a fetch address 38 in the instruction tag directory 39a, a valid bit indicating that this area 45 is valid and a tag 1 are stored. Moreover, in each area 45 specified by an index of the fetch address 38 in the trace tag directory 39b, a valid bit indicating that this area 45 is valid, a tag 1, a tag 2 and a trace fetch address set 46 are stored.

In an instruction cache hit judgment circuit 40a, when the valid bit in the area 45 is valid and the tag 1 in the same matches with the tag 1 of the fetch address 38, data of the instruction cache is hit. On the other hand, in a trace cache hit judgment circuit 40b, when the valid bit in the area 45 is valid and the tags 1 and 2 in the same match with the tags 1 and 2 of the fetch address 38, data of the trace cache is hit.

The operations of a fetch address selector 41 and subsequent parts when the instruction cache hit judgment circuit 40a and the trace cache hit judgment circuit 40b have hits are substantially the same as those in the multi-port instruction/trace integrated cache 30 according to the third embodiment, thereby eliminating the explanation. Incidentally, when the both circuits simultaneously have hits, the hit of the trace cache hit judgment circuit 40b has priority.

In the multi-port instruction/trace integrated cache according to the fifth embodiment having such as a structure, trace identification bits do not have to be set in the respective tag directories 39a and 39b. Therefore, judgment processing of the respective cache hit judgment circuits 40a and 40b is simplified.

It is to be noted that a trace fetch address set 46 is stored in each area 45 in the trace tag directory 39b in the multi-port instruction/trace integrated cache according to the fifth embodiment shown in FIG. 27. This trace fetch address set 46 can be stored in an external fetched line address cache (FLAC) 51 in place of the trace tag directory 39b like the multi-port instruction/trace integrated cache according to the fourth embodiment depicted in FIG. 25.

Figure 28:
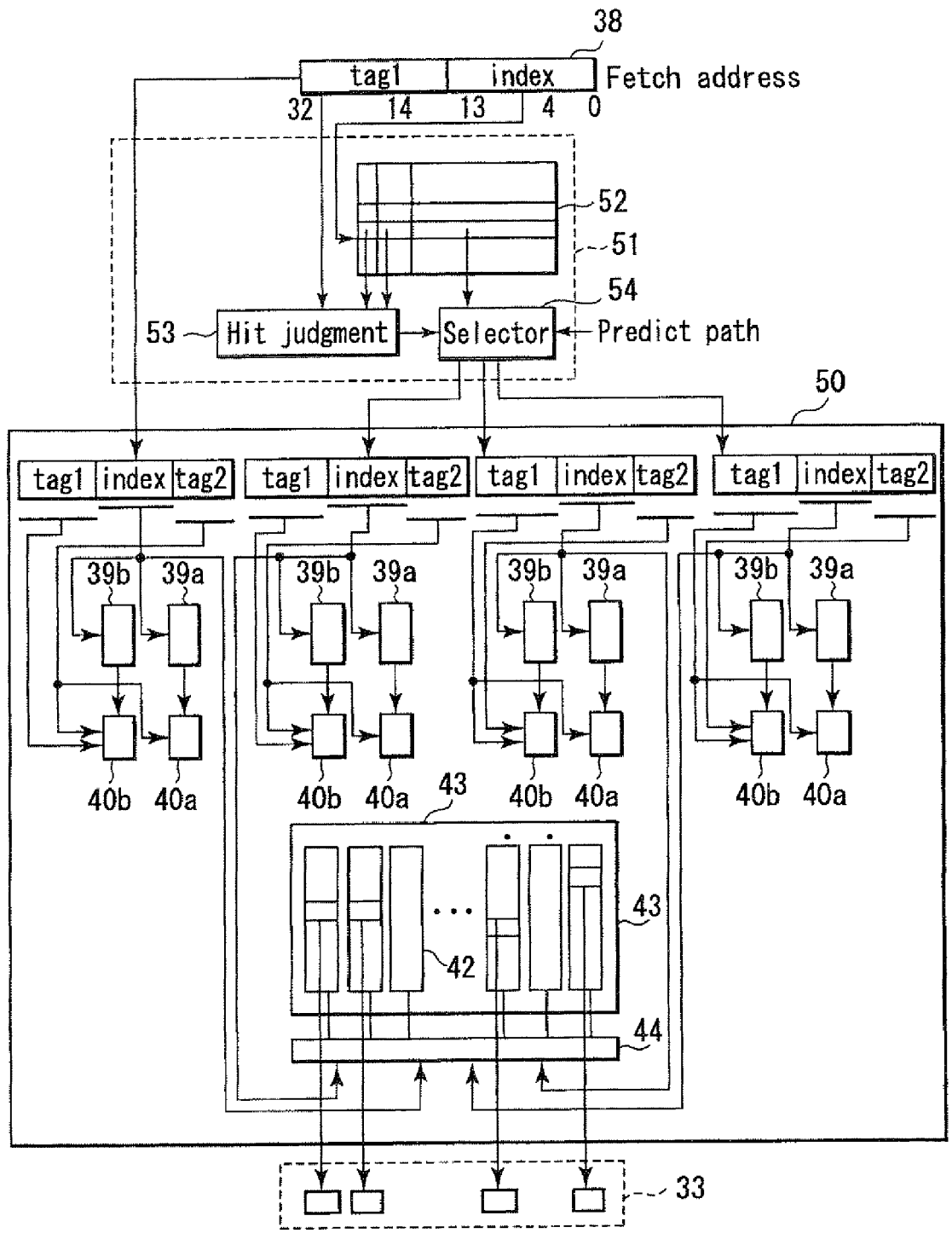
FIG. 28 is a schematic structural view showing a multi-port instruction/trace integrated cache according to another mode of the fifth embodiment.

In this case, as shown in FIG. 28, a plurality of instruction cache hit judgment circuits 40a and a plurality of trace cache hit judgment circuits 40b are provided in the multi-port instruction/trace integrated cache 50 in accordance with a plurality of instruction tag directories 39a and a plurality of trace tag directories 39b.

Sixth Embodiment

Figure 29:
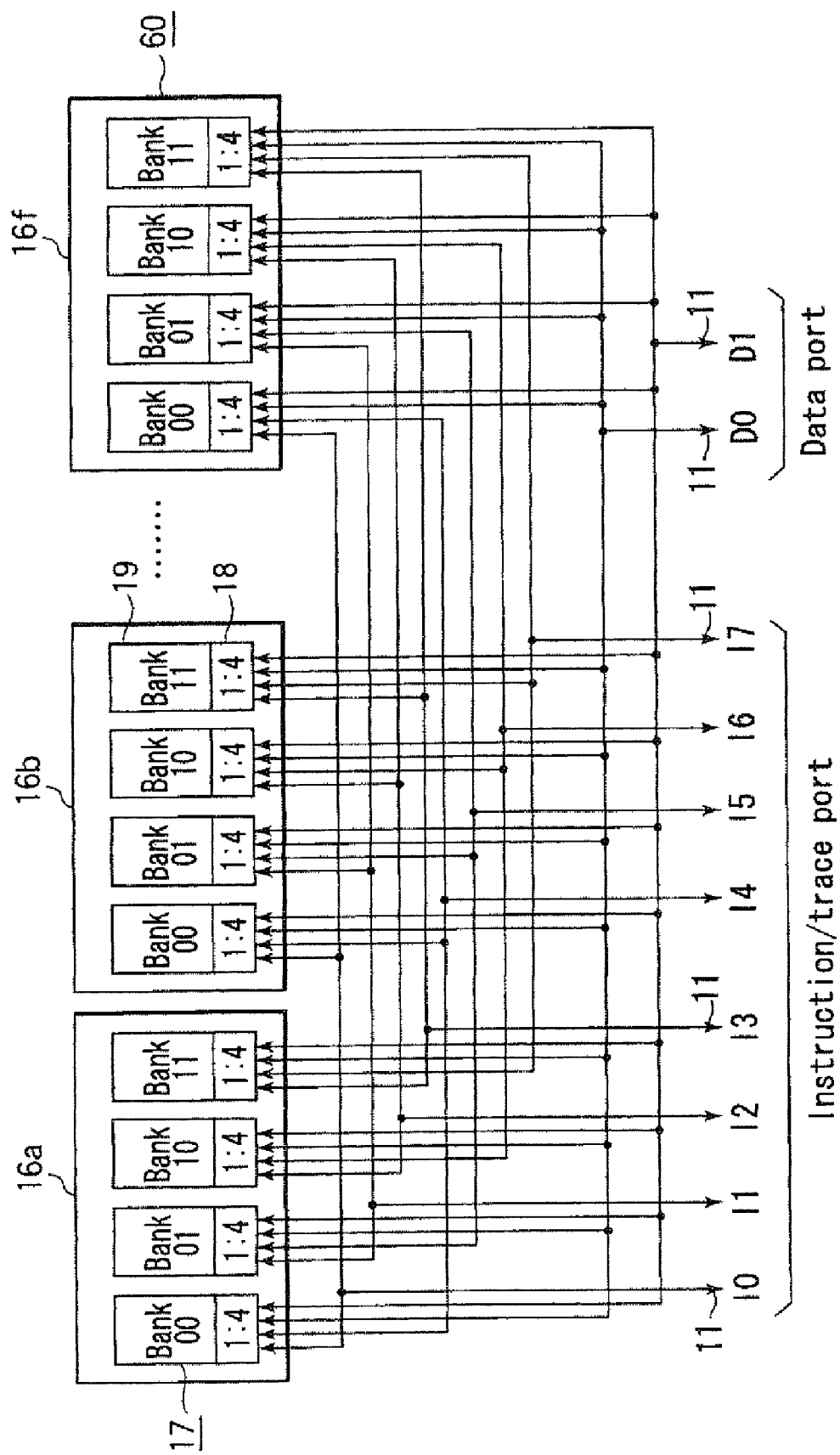
FIG. 29 is a schematic structural view showing a multi-port instruction/trace/data integrated cache according to a sixth embodiment of the present invention.

FIG. 29 is a schematic structural view of a multi-port instruction/trace/data integrated cache according to the sixth embodiment of the present invention. Like reference numerals denote parts equal to those in the multi-port instruction/data integrated cache depicted in FIG. 10. The detailed explanations of the same parts are eliminated.

The multi-port instruction/trace/data integrated cache 60 (which will be referred to as an integrated cache 60 hereinafter) according to the sixth embodiment is an integrated cache in which the instruction cache, the trace cache and the data cache according to the prior art are integrated.

In the integrated cache 60 according to the sixth embodiment, there are provided eight instruction ports 11 of I0 to I7 (data width: 64 bits), eight trace ports 11 of I0 to I7 overlapping the eight instruction ports (data width: 64 bits), and two data ports 11 of D0 and D1 (data width: eight bits).

For example, this integrated cache 60 has the following structure. Each instruction port and each trace port are predecoded by inferior two bits in an address in each bank 19, and can access only specific banks 19. The access contention does not necessarily occur in simultaneous access to continuous addresses. Additionally, access to non-continuous addresses is possible as long as two inferior two bits in the address are not in conflict with others. On the other hand, the data port can access all the banks 19 since a probability of access to continuous addresses is lower than that of the instruction port and the trace port. Further, to each bank 19 is disposed a port number conversion circuit 18 which converts four ports on each port 11 side into one port.

In the integrated cache 10 of FIG. 10, four instructions can be simultaneously read.

On the other hand, in the integrated cache 60 of FIG. 29, when accessing this integrated cache 60 as the instruction cache, it is possible to read not only four instructions but a total of eight continuous instructions by simultaneously accessing the eight continuous banks 19 by using the eight instruction ports of I0 to I7.

Furthermore, when accessing this integrated cache 60 as the trace cache, trace data consisting of an instruction string is read by accessing a corresponding bank 19 by using the eight trace ports of I0 to I7 and a history like the above-described embodiments. In this case, it is possible to access non-continuous banks 19 according to a history in place of completely continuous banks 19.

Moreover, when accessing this integrated cache 60 as the data cache, the two data ports D0 and D1 are used to access each bank 19, thereby reading data.

As described above, in the integrated cache 60 according to the sixth embodiment having the above described structure, since the instruction cache, the trace cache and the data cache according to the prior art can be integrated into one cache, a storage capacity required as the entire cache can be further reduced.

Seventh Embodiment

Figure 30:
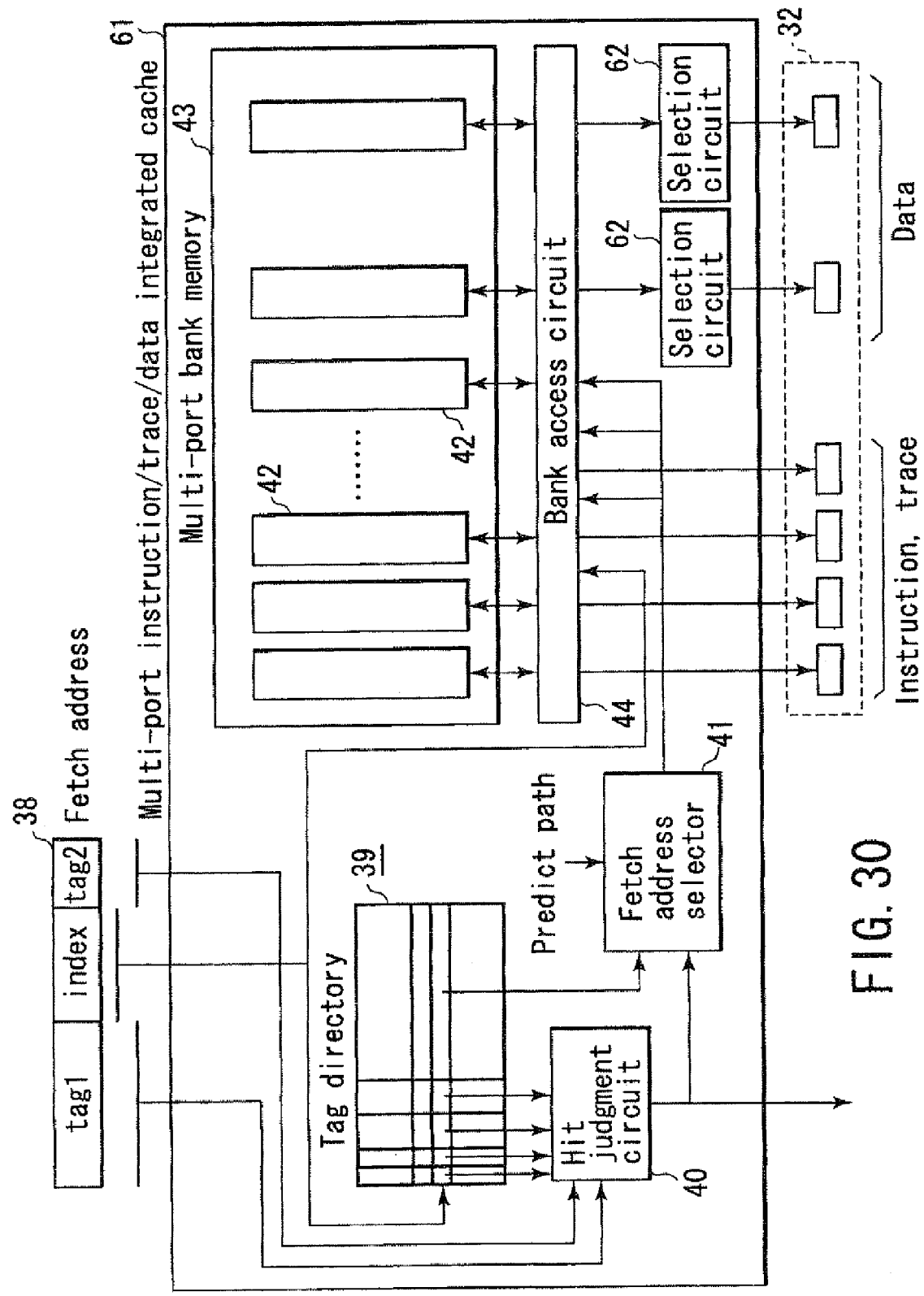
FIG. 30 is a schematic structural view showing a multi-port instruction/trace/data integrated cache according to a seventh embodiment of the present invention.

FIG. 30 is a schematic structural view of a multi port instruction/trace/data integrated cache 61 according to a seventh embodiment of the present invention. Like reference numerals denote parts equal to those in the multi-port instruction/trace integrated cache 30 according to the third embodiment depicted in FIG. 12. The detailed explanation of the same parts is eliminated.

In the multi-port instruction/trace/data integrated cache 61 (which will be referred to as "integrated cache 61" hereinafter) according to the seventh embodiment, an output port used to read instruction data and trace data and an output port used to read usual data (word), which is not an instruction, is provided as output port of a bank access circuit 44 which reads each data from each bank 42 of a multi-port bank memory 43.

Additionally, there is incorporated a selection circuit 62 which selects one set of data (one word) which is required by the processor among four sets of data (four words) of one line read from four selected banks 42 through the output port for usual data (word).

That is, in this integrated cache 61 according to the seventh embodiment, the instruction and trace read function in the integrated cache 30 according to the third embodiment depicted in FIG. 12 is used as it is. Further, the instruction read function (access function) is directly used as a data read function (access) function.

Since a data width of the instruction cache in the integrated cache 30 according to the third embodiment corresponds to four instructions, four continuous words corresponding to four instructions are taken out when accessing this instruction read function (access function) as the data cache. Therefore, as described above, one set of data (word) required by the processor must be selected by using the selection circuit 62.

Figure 31:
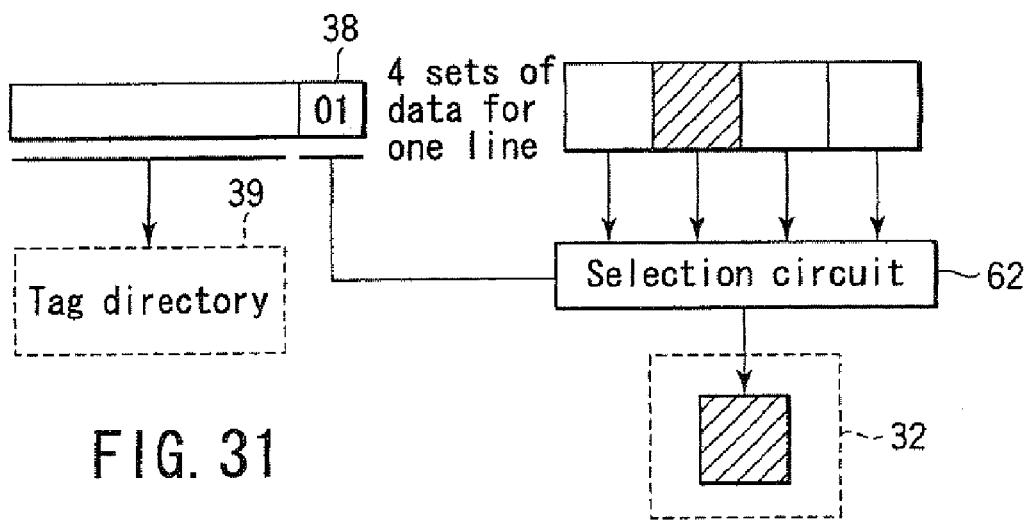
FIG. 31 is a view illustrating an operation of a selection circuit in the same integrated cache.

In regard to an addresses of four sets of data (four words) of one line as the instruction cache, its inferior two bits necessarily start from [00] and are followed by [01], [10] and [11]. As shown in FIG. 31, therefore, data which matches with a value of the inferior two bits in the fetch address 38 outputted from the processor is selected as one set of data required by the processor, and it is supplied to the instruction buffer 32.

Incidentally, as a result of accessing this integrated cache 61 as the data cache, when it is hit as the trace cache, data as the data cache cannot be guaranteed, and hence a cache miss is judged.

In the integrated cache 61 according to the seventh embodiment having the above-described structure, since the instruction cache, the trace cache and the data cache according to the prior art can be integrated as one cache by using the instruction read function (access function) as the data read function (access) function without any change, a storage capacity required as the entire cache can be further reduced.

It is to be noted that the present invention is not restricted to the foregoing embodiments. The integrated cache according to each embodiment is configured in such a manner that four instructions or sets of data are read at a time from the bank of the integrated cache. However, the number of instructions or sets of data which can be read at a time is not restricted to four, and it can be arbitrarily set.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

While illustrative embodiments have been illustrated and described, it will be appreciated that various changes can be made therein without departing from the spirit and scope of the invention.

What is claimed is:

1. A multi-port instruction/trace integrated cache which is provided between a parallel processor to execute a plurality of types of processing in one clock cycle and a main memory and in which an instruction cache and a trace cache are integrated, comprising:
   a multi-port bank memory which has a plurality of banks which store a part of instruction data stored in the main memory and a plurality of ports;
   a tag directory which has a plurality of areas each corresponding to an index set to a middle-order digit in a fetch address outputted from the parallel processor, each of the areas storing therein an identification bit indicating whether instruction data to be accessed is data of the trace cache, a tag 1 set to a high-order digit in the fetch address, a tag 2 set to a lower-order digit in the fetch address, and a plurality of addresses which specify instruction data stored in each bank of the multi-port bank memory;
   an instruction cache hit judgment circuit which judges that the instruction data to be accessed is stored in the multi-port bank memory based on the tag 1 and the identification bit;
   a trace cache hit judgment circuit which judges that an instruction data string to be accessed is stored in the multi-port bank memory based on the tag 1, the tag 2 and the identification bit; and
   a fetch address selector which selects a predetermined number of addresses among a plurality of addresses stored in a corresponding area of the tag directory in accordance with a hit judgment by the trace cache hit judgment circuit, supplies them to the multi-port bank memory, and causes instruction data in each bank to be simultaneously read.

2. A multi-port instruction/trace integrated cache which is provided between a parallel processor to execute a plurality of types of processing in one clock cycle and a main memory and in which an instruction cache and a trace cache are integrated, comprising:
- a multi-port bank memory which has a plurality of banks which store a part of instruction data stored in the main memory and a plurality of ports;
- a plurality of tag directories to which fetch addresses which are based on a fetch address of the parallel processor and different from each other are inputted from a fetched line address cache, and each of which has a plurality of areas each corresponding to an index set to a middle-order digit in the inputted fetch address, each of the areas storing an identification bit indicating whether instruction data to be accessed is data of the race cache, a tag 1 set to a higher-order digit in the fetch address, and a tag 2 set to a lower-order digit in the fetch address;
- a plurality of instruction cache hit judgment circuits which are provided in accordance with the respective tag directories and judge that the instruction data to be accessed is stored in the multi-port bank memory based on the tag 1 and the identification bit;
- a plurality of trace cache hit judgment circuits which are provided in accordance with the respective tag directories and judge that an instruction string to be accessed is stored in the multi-port bank memory based on the tag 1, the tag 2 and the identification bit; and
- a bank access circuit which supplies each fetch address inputted to a corresponding tag directory to the multi-port bank memory in accordance with a hit judgment by the respective cache hit judgment circuits, and simultaneously reads instruction data of each bank.

3. A multi-port instruction/trace integrated cache which is provided between a parallel processor to execute a plurality of types of processing in one clock cycle and a main memory, and in which and instruction cache and a trace cache are integrated, comprising:
- a multi-port bank memory which has a plurality of banks which store a part of instruction data stored in the main memory and a plurality of ports;
- an instruction tag directory having a plurality of areas each of which corresponds to an index set to a middle-order digit in a fetch address outputted from the parallel processor, each of the areas storing a tag 1 set to a higher-order digit in the fetch address;
- a trace tag directory having a plurality of areas each of which corresponds to an index set to a middle order digit in a fetch address outputted from the parallel processor, each of the areas storing a tag 1 set to a higher-order digit in the fetch address, a tag 2 set to a lower-order digit in the fetch address, and a plurality of addresses each of which specifies instruction data stored in each bank of the multi-port bank memory;
- an instruction cache hit judgment circuit which judges that instruction data to be accessed is stored in the multi-port bank memory based on the tag 1;
- a trace cache hit judgment circuit which judges that an instruction data string to be accessed is stored in the multi-port bank memory based on the tag 1 and the tag 2; and
- a fetch address selector which selects a predetermined number of addresses among a plurality of addresses stored in a corresponding area of the tag directory in accordance with a hit judgment by the trace cache hit judgment circuit, supplies them to the multi-port bank memory, and causes instruction data in each bank to be simultaneously read.

4. A multi-port instruction/trace integrated cache which is provided between a parallel processor to execute a plurality of types of processing in one clock cycle and a main memory and in which an instruction cache and a trace cache are integrated, comprising:
- a multi-port bank memory having a plurality of banks which store a part of instruction data stored in the main memory and a plurality of ports;
- a plurality of instruction tag directories to which fetch addresses which are based on a fetch address of the parallel processor and different from each other are inputted from a fetched line address cache, and each of which has a plurality of areas each corresponding to an index set to a middle-order digit in the inputted fetch address, each of the areas storing a tag 1 set to a higher-order digit in the fetch address;
- a plurality of trace tag directories to which fetch addresses which are based on the fetch address of the parallel processor and different from each other are inputted from the fetched line address cache, and each of which has a plurality of areas each corresponding to an index set to a middle-order digit of the inputted fetch address, each of the areas storing a tag 1 set to a higher-order digit in the fetch address, and a tag 2 set to a lower-order digit in the fetch address;
- a plurality of instruction cache hit judgment circuits which are provided in accordance with the respective instruction tag directories, and judge that instruction data to be accessed is stored in the multi-port bank memory based on the tag 1;
- a plurality of trace cache hit judgment circuits which are provided in accordance with the respective instruction tag directories, and judge that an instruction data string to be accessed is stored in the multi-port bank memory based on the tag 1 and the tag 2; and
- a bank access circuit which supplies each fetch address inputted to a corresponding tag directory to the multi-port bank memory in accordance with a hit judgment by each of the cache hit judgment circuits, and simultaneously reads instruction data in each bank.

5. The multi-port instruction/trace integrated cache according to claim 1 or 3, wherein a plurality of addresses stored in each area of the tag directory are updated based on an address of each instruction executed when a corresponding area is hit on the last occasion.

6. The multi-port instruction/trace integrated cache according to claim 5, wherein a plurality of addresses stored in the respective areas of the tag directory include an address of each instruction executed when the corresponding area is hit on the last occasion and an address of a branch target instruction that branching is possible after the aforesaid instruction.

7. The multi-port instruction/trace integrated cache according to claim 5, wherein the fetch address selector selects the predetermined number of addresses based on a branch prediction of each instruction inputted from a branch predictor.

8. The multi-port instruction/trace integrated cache according to claim 6, wherein the fetch address selector selects the predetermined number of addresses based on a branch prediction of each instruction inputted from a branch predictor.

9. The multi-port instruction/trace integrated cache according to claim 2 or 4, wherein a plurality of the fetch addresses outputted from the fetched line address cache are updated based on an address of each instruction executed when the fetch addresses are hit on the last occasion.

10. The multi-port instruction/trace integrated cache according to claim 9, wherein a plurality of the fetch addresses outputted from the fetched line address cache include an address of each instruction executed when the fetch addresses are hit on the last occasion and an address of a branch target instruction that branching is possible after the aforesaid instruction.

11. A multi-port instruction/trace/data integrated cache which is provided between a parallel processor to execute a plurality of types of processing in one clock cycle and a main memory and in which an instruction cache, a trace cache and a data cache are integrated, comprising:

a multi-port bank memory which has a plurality of banks which store a part of instructions and data stored in the main memory, and a plurality of ports;

a tag directory having a plurality of areas each corresponding to an index set to a middle-order digit in a fetch address outputted from the parallel processor, each of the areas storing an identification bit indicating whether an instruction or data to be accessed is data of the trace cache, a tag 1 set to a higher-order digit in the fetch address, a tag 2 set to a lower-order digit in the fetch address, and a plurality of addresses which specify an instruction or data stored in each bank of the multi-port bank memory;

an instruction cache hit judgment circuit which judges that the instruction or data to be accessed is stored in the multi-port bank memory based on the tag 1 and the identification bit;

a trace cache hit judgment circuit which judges that the instruction to be accessed is stored in the multi-port bank based on the tag 1, the tag 2 and the identification bit;

a fetch address selector which selects a predetermined number of addresses among a plurality of addresses stored in a corresponding area of the tag directory in accordance with a hit judgment by each cache hit judgment circuit, supplies them to the multi-port bank memory, and causes instructions or data in each bank to be simultaneously read; and a selection circuit which selects data required by the parallel processor from a plurality of sets of data read from the multi-port bank memory.

* * * * *

UNITED STATES PATENT AND TRADEMARK OFFICE
CERTIFICATE OF CORRECTION

| | | |
|---|---|---|
| PATENT NO. | : 7,694,077 B2 | Page 1 of 1 |
| APPLICATION NO. | : 12/034454 | |
| DATED | : April 6, 2010 | |
| INVENTOR(S) | : T. Hironaka et al. | |

It is certified that error appears in the above-identified patent and that said Letters Patent is hereby corrected as shown below:

| COLUMN | LINE | ERROR |
|---|---|---|
| Title page Item (75) | 1st Inventor Tetsuo Hironaka | "Hiroshima" should read --Hiroshima-shi-- |
| Title page Item (75) | 2nd Inventor Hans Jurgen Mattausch | "Higashihiroshima" should read --Higashihiroshima-shi-- |
| Title page Item (75) | 3rd Inventor Tetsushi Koide | "Higashihiroshima" should read --Higashihiroshima-shi-- |
| Title page Item (75) | 4th Inventor Tai Hirakawa | "Hiroshima" should read --Hiroshima-shi-- |
| Title page Item (75) | 5th Inventor Koh Johguchi | "Hiroshima" should read --Hiroshima-shi-- |
| 21 (Claim 2, | 14 line 16) | "the race cache," should read --the trace cache,-- |
| 21 (Claim 3, | 35 line 4) | "in which and instruction" should read --in which an instruction-- |

Signed and Sealed this

Seventeenth Day of August, 2010

David J. Kappos
*Director of the United States Patent and Trademark Office*